US011274738B2

(12) United States Patent
Smith

(10) Patent No.: US 11,274,738 B2
(45) Date of Patent: Mar. 15, 2022

(54) LUBRICANT COLLECTOR

(71) Applicant: DANA HEAVY VEHICLE SYSTEMS GROUP, LLC, Maumee, OH (US)

(72) Inventor: Shane T. Smith, Sylvania, OH (US)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 0 days.

(21) Appl. No.: 17/042,990

(22) PCT Filed: Mar. 29, 2019

(86) PCT No.: PCT/US2019/024733
§ 371 (c)(1),
(2) Date: Sep. 29, 2020

(87) PCT Pub. No.: WO2019/191529
PCT Pub. Date: Oct. 3, 2019

(65) Prior Publication Data
US 2021/0018086 A1  Jan. 21, 2021

Related U.S. Application Data

(60) Provisional application No. 62/650,392, filed on Mar. 30, 2018.

(51) Int. Cl.
*F16H 57/04* (2010.01)
*F16H 57/037* (2012.01)
*F16H 57/02* (2012.01)

(52) U.S. Cl.
CPC ....... *F16H 57/0409* (2013.01); *F16H 57/037* (2013.01); *F16H 57/045* (2013.01);
(Continued)

(58) Field of Classification Search
CPC .............. F16H 57/0409; F16H 57/037; F16H 57/0423; F16H 57/0424; F16H 57/045;
(Continued)

(56) References Cited

U.S. PATENT DOCUMENTS 3,529,698 A * 9/1970 Nelson ................ F16H 57/0447
184/6.12
5,821,653 A * 10/1998 Kinto .................. F16H 57/0447
310/89

(Continued)

FOREIGN PATENT DOCUMENTS

DE 102010010411 A1 * 9/2011 ......... F16H 57/0483
EP 2988027 2/2016
(Continued)

*Primary Examiner* — Sherry L Estremsky
(74) *Attorney, Agent, or Firm* — Marshall & Melhorn, LLC

(57) ABSTRACT

A vehicle drive unit assembly having a ring gear with a plurality of ring gear teeth extending from an outer surface thereof. At least a portion of a lubricant collector having a body portion with a first side, a second side, a first end portion, a second end portion and an intermediate portion is disposed proximate to and directly adjacent at least a portion of the ring gear. The lubricant collector has one or more first receiving portions and/or one or more second receiving portions defining a collector reservoir therein. The one or more first receiving portions and/or one or more second receiving portions of the collector reservoir receive an amount of lubricating fluid that is expelled or thrown from the ring gear.

17 Claims, 10 Drawing Sheets

(52) U.S. Cl.
CPC ..... *F16H 57/0423* (2013.01); *F16H 57/0424* (2013.01); *F16H 57/0457* (2013.01); *F16H 57/0483* (2013.01); *F16H 57/0471* (2013.01); *F16H 57/0497* (2013.01); *F16H 2057/02052* (2013.01)

(58) Field of Classification Search
CPC ............. F16H 57/0457; F16H 57/0483; F16H 57/0497; F16H 2057/02052
See application file for complete search history.

(56) References Cited

U.S. PATENT DOCUMENTS

| | | | |
|---|---|---|---|
| 8,181,548 B2* | 5/2012 | Michishita | B60K 6/52 74/421 A |
| 9,927,020 B2* | 3/2018 | Keeney | F16H 57/037 |
| 10,955,041 B2* | 3/2021 | Smith | F16H 57/0483 |
| 11,054,019 B2* | 7/2021 | Lamm | F16H 37/042 |
| 2010/0144480 A1 | 6/2010 | Downs | |
| 2019/0170243 A1* | 6/2019 | Brizendine | F16H 57/0434 |

FOREIGN PATENT DOCUMENTS

| | | | |
|---|---|---|---|
| JP | H07217725 A | * | 8/1995 |
| JP | H08247260 | | 9/1996 |

* cited by examiner

LUBRICANT COLLECTOR

CROSS-REFERENCE TO RELATED APPLICATIONS

The present application claims the benefit to U.S. Provisional Patent Application No. 62/650,392 filed on Mar. 30, 2018, which is incorporated herein by reference in its entirety.

FIELD OF THE DISCLOSURE

The present disclosure relates to a lubricant collector for use in a vehicle.

BACKGROUND OF THE DISCLOSURE

Various drive train systems are widely used in order to transmit an amount of rotational power generated by a source of rotational power to one or more driven components. For example, the source of rotational power may be an engine or motor that generates an amount of rotational power needed to drive one or more wheel assemblies.

Typically, a vehicle drive train includes the use of one or more drive unit assemblies that transmit an amount of the rotational power generated by the engine to the one or more wheel assemblies of the vehicle. A conventional drive unit assembly includes the use of one or more gears meshed together within a housing. In order to improve the overall life and durability of the drive unit assemblies, an amount of lubrication fluid is included within the housing to lubricate the gears of the drive unit assemblies. Some lubricating systems are pump driven in order to supply an amount of lubrication fluid to the various elements within the drive unit assembly. In contrast, some lubricating systems utilize splash lubrication methods which are not as reliable as the pump lubrication systems. In the conventional splash lubrication systems, an amount of lubricant clings to the rotating component of the drive unit assembly as they pass through the lubricant within a sump or reservoir. The lubricant is then slung or thrown away from the rotating component due to centrifugal forces exerted onto the lubricating fluid when in operation. As a result, the splash lubrication methods do not generally insure that lubricant will be accurately or sufficiently supplied to the various elements of the drive unit assembly. The problem with the splash lubrication systems is that the drive unit assembly suffers from various parasitic and/or churning losses that result from the resistance offered by the rotating components through the lubricant within the sump or reservoir of the drive unit assembly. This reduces the overall efficiency of the drive unit assemblies and reduces the amount of rotational power that is transmitted from the engine to the wheels of the vehicle.

It would be advantageous to develop a drive unit assembly that has an improved overall efficiency, while also ensuring all the components of the drive unit assembly are adequately lubricated for performance and longevity.

SUMMARY OF THE DISCLOSURE

A vehicle drive unit assembly having a ring gear with a plurality of ring gear teeth extending from an outer surface thereof. At least a portion of a lubricant collector having a body portion with a first side, a second side, a first end portion, a second end portion and an intermediate portion is disposed proximate to and directly adjacent at least a portion of the ring gear. The lubricant collector has one or more first receiving portions and/or one or more second receiving portions defining a collector reservoir therein. The one or more first receiving portions and/or one or more second receiving portions of the collector reservoir receive an amount of lubricating fluid that is expelled or thrown from the ring gear.

According to an aspect of the disclosure, the lubricant collector may be integrally formed as part of a housing of the drive unit assembly or the lubricant collector may be integrally connected to at least a portion of the housing of the drive unit assembly.

According to any one of the previous aspects of the disclosure, at least a portion of the one or more first receiving portions are disposed directly adjacent to and radially outboard from at least a portion of a radially outermost surface of the ring gear.

According to any one of the previous aspects of the disclosure, at least a portion of the one or more second receiving portions may be disposed proximate to and axially outboard from at least a portion of the plurality of ring gear teeth on the ring gear.

According to any one of the previous aspects of the disclosure, the one or more first receiving portions may have a first bottom portion extending in a downward angle. At least a portion of the bottom portion of the one or more first receiving portions may have a shape defined by a radius. The radius of the first bottom portion of the one or more first receiving portions may be greater than a radius of the radially outermost surface of the ring gear.

According to any one of the previous aspects of the disclosure, the one or more second receiving portions may have a second bottom portion extending in a downward angle. At least a portion of the second bottom portion of the one or more second receiving portions may be disposed outboard and off-set from at least a portion of the first bottom portion of the one or more first receiving portions of the lubricant collector.

According to any one of the previous aspects of the disclosure, at least a portion of the first bottom portion of the one or more first receiving portions and/or at least a portion of the second bottom portion of the one or more second receiving portions terminate at one or more directing surfaces.

According to any one of the previous aspects of the disclosure, the one or more directing surfaces of the lubricant collector may have one or more surface features thereon.

According to any one of the previous aspects of the disclosure, the one or more surface features on the one or more directing surfaces are one or more ribs, one or more channels, one or more grooves and/or one or more areas of increased material thickness.

According to any one of the previous aspects of the disclosure, the drive unit assembly may further include a shroud having an inner surface, an outer surface, a first side, a second side, a first end portion, a second end portion and an intermediate portion interposed between said first and second end portions. At least a portion of the shroud may be is disposed within at least a portion of a hollow interior portion of the housing. One or more first shroud channels having one or more inlet openings and one or more outlet openings may extend inward into a body portion of the shroud from at least a portion of the second side of the shroud. At least a portion of the one or more inlet openings of the one or more first shroud channels may be disposed in the second side of the shroud. Additionally, at least a portion of the one or more outlet openings may be disposed in the inner surface of the first end portion of the shroud. The lubricant collector may direct an amount of the lubricating fluid collected from the ring gear toward the one or more inlet openings in the body portion of the shroud.

According to any one of the previous aspects of the disclosure, at least a portion of the shroud may be integrally connected to at least a portion of the inner surface of the housing or may be integrally formed as part of an inner surface of the housing.

According to any one of the previous aspects of the disclosure, the drive unit assembly may be an inter-axle differential assembly.

According to any one of the previous aspects of the disclosure, at least a portion of a helical gear of the gear assembly may be disposed proximate to and directly adjacent to at least a portion of the inner surface of the shroud.

According to any one of the previous aspects of the disclosure, at least a portion of the inner surface of the first end portion and the intermediate portion of the shroud may be defined by a substantially continuous radius R1 from a theoretical center TC of the helical gear. The radius R1 of the shroud may be greater than a radius R2 of the outermost surface of the helical gear.

According to any one of the previous aspects of the disclosure, at least a portion of the second end portion of the shroud has one or more lubricant directing portions. The one or more lubricant directing portions of the shroud may direct an amount of lubricating fluid to a secondary reservoir in the housing.

According to any one of the previous aspects of the disclosure, the secondary reservoir integrally formed into the inner surface of the housing or may be integrally connected to at least a portion of the inner surface of the housing.

According to any one of the previous aspects of the disclosure, the secondary reservoir may be in fluid communication with one or more channels in the inner surface of the housing in order to supply an amount of lubricating fluid to one or more bearing assemblies rotationally supporting a pinion gear shaft.

According to any one of the previous aspects of the disclosure, at least a portion of the inner surface of the first end portion and the intermediate portion of the shroud may be defined by a substantially continuous radius R1 from a theoretical center TC of a helical gear. The one or more lubricant directing portions of the shroud may extend at an angle θ1 away from the substantially circular path created by the radius R1 of the shroud.

According to any one of the previous aspects of the disclosure, at least a portion of the inner surface of the first end portion and the intermediate portion of the shroud may be defined by a substantially continuous radius R1 from a theoretical center TC of a helical gear. The one or more lubricant directing portions of the shroud extend substantially tangentially relative to the substantially circular path created by the radius R1 of the shroud.

According to any one of the previous aspects of the disclosure, the one or more first shroud channels extend inward at an angle θ3 relative to a horizontal plane intersecting the one or more first shroud channels.

According to any one of the previous aspects of the disclosure, the one or more outlet openings may be in fluid communication with the one or more first shroud channels by one or more second shroud channels extending at an angle θ2 relative to the one or more first shroud channels in the shroud.

According to any one of the previous aspects of the disclosure, the shroud has one or more protruding portions extending outward from at least a portion of the outer surface of the intermediate portion of the shroud. The one or more protruding portions of the shroud may be received and/or retained within at least a portion of one or more first shroud receiving portions in the inner surface of the housing.

According to any one of the previous aspects of the disclosure, the inner surface of the housing has one or more second shroud receiving portions that are axially off-set from the one or more first shroud receiving portions. At least a portion of the second end portion of the shroud may be received and/or retained within at least a portion of the one or more second shroud receiving portions.

According to any one of the previous aspects of the disclosure, the drive unit assembly may further include further comprising a collector having an inner surface, an outer surface, a first end portion, a second end portion, a first side and a second side. At least a portion of the second side of the collector may be disposed proximate to at least a portion of the one or more inlet openings of the one or more first shroud channels. The collector collects an amount of lubricating fluid from the lubricant collector and directs the lubricating fluid toward the one or more inlet openings of the one or more first shroud channels in the shroud.

According to any one of the previous aspects of the disclosure, the outer surface of the collector may have one or more collector grooves that extend toward the one or more inlet openings of the one or more first shroud channels in the shroud.

According to any one of the previous aspects of the disclosure, the outer surface of the collector may have one or more collector grooves that extend toward the one or more inlet openings of the one or more first shroud channels in the shroud.

According to any one of the previous aspects of the disclosure, at least a portion of the collector may be integrally connected to at least a portion of the inner surface of the housing, integrally formed as part of the shroud or integrally formed as part of the housing.

According to any one of the previous aspects of the disclosure, the collector may further include one or more gear receiving portions. The one or more gear receiving portions may extend inward from at least a portion of the first side of the collector.

According to any one of the previous aspects of the disclosure, the one or more gear receiving portions of the collector may be of a size and shape to receive at least a portion of a gear.

According to any one of the previous aspects of the disclosure, the gear may be a ring gear of the gear assembly disposed within at least a portion of the hollow interior portion of the housing.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the lubricant directing shroud disclosed herein may be used in automotive, off-road vehicle, all-terrain vehicle, construction, structural, marine, aerospace, locomotive, military, machinery, robotic and/or consumer product applications. Additionally, as a non-limiting example, the lubricant directing shroud disclosed herein may also be used in passenger vehicle, electric vehicle, hybrid vehicle, commercial vehicle, autonomous vehicles, semi-autonomous vehicles and/or heavy vehicle applications.

Figure 1:
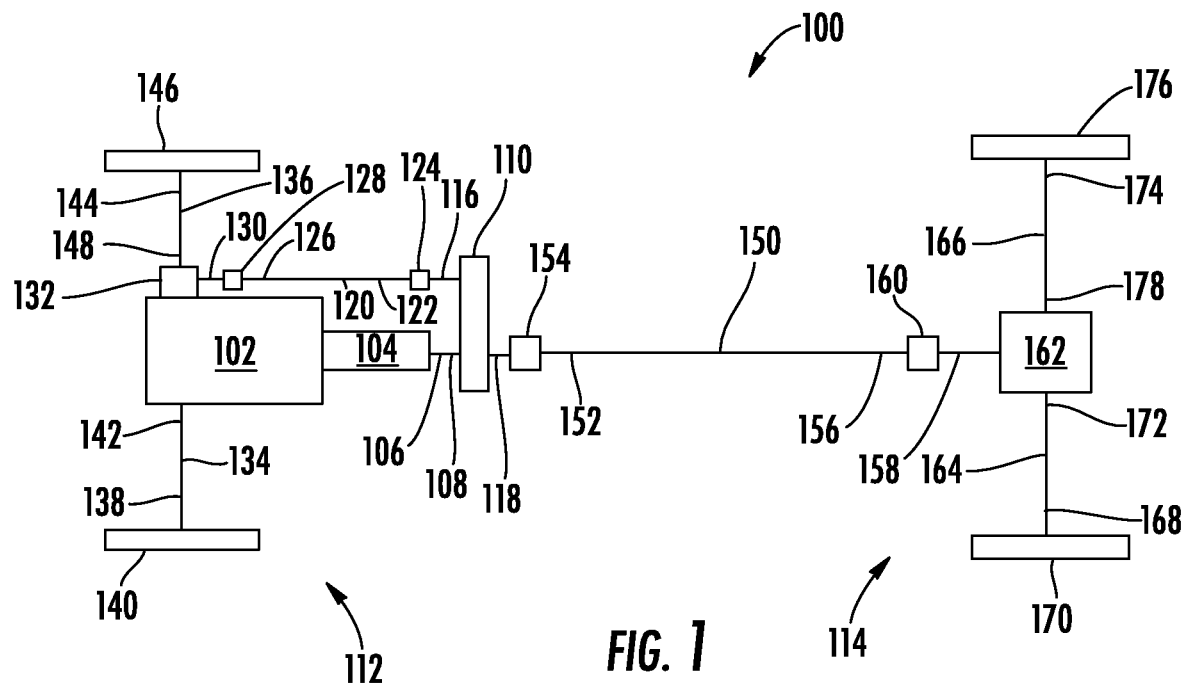
FIG. 1 is a schematic top-plan view of a vehicle having one or more lubrication fluid shrouds according to an embodiment of the disclosure.

FIG. 1 is a schematic top-plan view of a vehicle 100 having one or more lubrication fluid shrouds according to an embodiment of the disclosure. The vehicle 100 has an engine 102, which is drivingly connected to a transmission 104. A transmission output shaft 106 is then drivingly connected to an end of the transmission 104 opposite the engine 102. It is within the scope of this disclosure and as a non-limiting example that the engine 102 of the vehicle 100 may be an internal combustion engine, an electric motor, a steam turbine and/or a gas turbine. The transmission 104 is a power management system, which provides controlled application of the rotational energy generated by the engine 102 by means of a gearbox.

The transmission output shaft 106 is drivingly connected to a transfer case input shaft 108, which in turn is drivingly connected to a transfer case 110. The transfer case 110 is used in four-wheel drive and/or all-wheel-drive (AWD) vehicles to transfer the rotational power from the transmission 104 to a front axle system 112 and a rear axle system 114 by utilizing a series of gears and drive shafts. Additionally, the transfer case 110 allows the vehicle 100 to selectively operate in either a two-wheel drive mode of a four-wheel/AWD drive mode. As illustrated in FIG. 1 of the disclosure and as a non-limiting example, the transfer case 110 includes a first transfer case output shaft 116 and a second transfer case output shaft 118.

A first shaft 120 extends from the first transfer case output shaft 116 toward the front axle system 112 of the vehicle 100. The first shaft 120 transmits the rotational power from the transfer case 110 to the front axle system 112 of the vehicle 100 thereby drivingly connecting the transfer case 110 to the front axle system 112. It is within the scope of this disclosure and as a non-limiting example that the first shaft 120 may be a drive shaft, a prop shaft or a Cardan shaft.

As illustrated in FIG. 1 of the disclosure and as a non-limiting example, at least a portion of a first end portion 122 of the first shaft 120 is drivingly connected to an end of the first transfer case output shaft 116 opposite the transfer case 110 via a first joint assembly 124. Additionally, as illustrated in FIG. 1 of the disclosure and as a non-limiting example, at least a portion of a second end portion 126 of the first shaft 120 may be drivingly connected to an end of a second joint assembly 128. It is within the scope of this disclosure and as a non-limiting example that the first and/or second joint assembly 124 and/or 128 of the vehicle 100 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second joint assembly 128, opposite the first shaft 120, is a front axle input shaft 130. The front axle input shaft 130 of the vehicle 100 drivingly connects the first shaft 120 of the vehicle 100 to a front axle differential assembly 132 of the front axle system 112. In accordance with the embodiment to of the disclosure illustrated in FIG. 1 and as a non-limiting example, at least a portion of an end of the front axle system input shaft 130, opposite the first shaft 120, is drivingly connected to at least a portion of the front axle differential assembly 132. It is within the scope of this disclosure and as a non-limiting example that the front axle input shaft 130 may be a front differential input shaft, a coupling shaft, stub shaft or a front differential pinion shaft. The front axle differential assembly 132 is a set of gears that allows the outer drive wheel(s) of the vehicle 100 to rotate at a faster rate that the inner drive wheel(s). The rotational power is transmitted through the front axle system 112 as described in more detail below.

The front axle system 112 further includes a first front axle half shaft 134 and a second front axle half shaft 136. As illustrated in FIG. 1 of the disclosure and as a non-limiting example, the first front axle half shaft 134 extends substantially perpendicular to the front axle input shaft 130 of the vehicle 100. At least a portion of a first end portion 138 of the first front axle half shaft 134 is drivingly connected to a first front axle wheel assembly 140. As illustrated in FIG. 1 of the disclosure and as a non-limiting example, at least a portion of a second end portion 142 of the first front axle half shaft 134 is drivingly connected to an end of the front axle differential assembly 132. It is within the scope of this disclosure and as a non-limiting example that the second end portion 142 of the first front axle half shaft 134 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 130 is the second front axle half shaft 136. At least a portion of a first end portion 144 of the second front axle half shaft 136 is drivingly connected to a second front axle wheel assembly 146. As illustrated in FIG. 1 of the disclosure and as a non-limiting example, at least a portion of a second end portion 148 of the second front axle half shaft 136 is drivingly connected to an end of the front axle differential assembly 132 opposite the first front axle half shaft 134. It is within the scope of this disclosure and as a non-limiting example that the second end portion 148 of the second front axle half shaft 136 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 118 is drivingly connected to an end of the transfer case 110 opposite the transfer case input shaft 108 of the vehicle 100. A second shaft 150 extends from the second transfer case output shaft 118 toward the rear axle system 114 thereby drivingly connecting the transfer case 110 to the rear axle system 114 of the vehicle 100. As a non-limiting example, the second shaft 150 may be a drive shaft, a propeller shaft or a Cardan shaft. At least a portion of a first end portion 152 of the second shaft 150 is drivingly connected to an end of the second transfer case output shaft 118 opposite the transfer case 110 via a third joint assembly 154. It is within the scope of this disclosure and as a non-limiting example that the second shaft 150 may be a drive shaft, a propeller shaft or a Cardan shaft. Additionally, it is within the scope of this disclosure and as a non-limiting example that the seventh joint assembly 154 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure and as a non-limiting example, at least a portion of a second end portion 156 of the second haft 150 is drivingly connected to a rear axle system input shaft 158 via a fourth joint assembly 160. The rear axle system input shaft 158 drivingly connects the transfer case 100 to the rear axle system 114 of the vehicle 100. It is within the scope of this disclosure and as a non-limiting example that the rear axle system input shaft 158 may be a rear axle differential input shaft, a coupling shaft, stub shaft or a rear axle differential pinion shaft. Additionally, it is within the scope of this disclosure and as a non-limiting example that the fourth joint assembly 160 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the rear axle system input shaft 158, opposite the second shaft 150, is a rear axle differential assembly 162 of the rear axle system 114. The rear axle differential assembly 162 is a set of gears that allows the outer drive wheel(s) of the vehicle 100 to rotate at a faster rate that the inner drive wheel(s). The rotational power is transmitted through the rear axle system 114 as described in more detail below.

As illustrated in FIG. 1 of the disclosure and as a non-limiting example, the rear axle system 114 further includes a first rear axle half shaft 164 and a second rear axle half shaft 166. The first rear axle half shaft 164 extends substantially perpendicular to the rear axle input shaft 158 of the vehicle 100. At least a portion of a first end portion 168 of the first rear axle half shaft 164 is drivingly connected to a first rear axle wheel assembly 170. As illustrated in FIG. 1 of the disclosure and as a non-limiting example, at least a portion of a second end portion 172 of the first rear axle half shaft 164 is drivingly connected to an end of the rear axle differential assembly 162. It is within the scope of this disclosure and as a non-limiting example that the second end portion 172 of the first rear axle half shaft 164 may be drivingly connected to a rear differential side gear, a separate stub shaft, a separate coupling shaft, a first rear axle differential output shaft a first rear axle half shaft connect and disconnect assembly and/or a shaft that is formed as part of a rear differential side gear.

Extending substantially perpendicular to the rear axle system input shaft 158 the second rear axle half shaft 166. At least a portion of a first end portion 174 of the second rear axle half shaft 166 is drivingly connected to a second rear axle wheel assembly 176 of the vehicle 100. As illustrated in FIG. 1 of the disclosure and as a non-limiting example, at least a portion of a second end portion 178 of the second rear axle half shaft 166 is drivingly connected to an end of the rear axle differential assembly 162 opposite the first rear axle half shaft 164. It is within the scope of this disclosure and as a non-limiting example that the second end portion 178 of the second rear axle half shaft 166 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear.

It is within the scope of this disclosure and as a non-limiting example that the transmission 104, the transfer case 110, the front axle differential assembly 132 and/or the rear axle differential assembly 162 may include the use of a lubricant shroud according to an embodiment of the disclosure.

Figure 2:
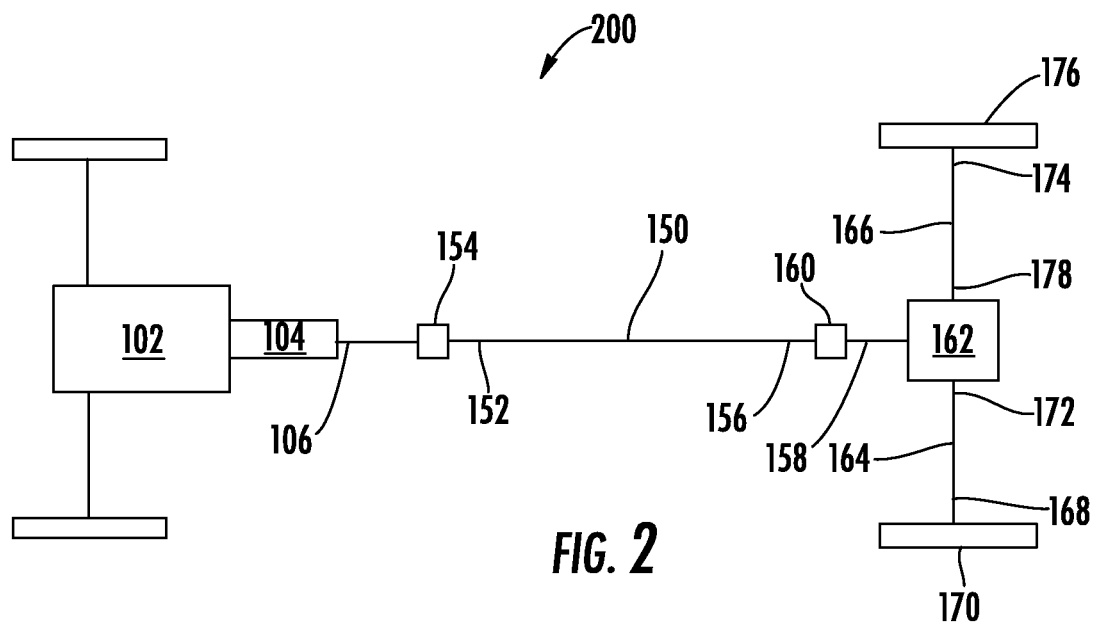
FIG. 2 is a schematic top-plan view of another vehicle having one or more lubrication fluid shrouds according to an embodiment of the disclosure.

FIG. 2 is a schematic top-plan view of another vehicle 200 having one or more quick connect assemblies according to an embodiment of the disclosure. The vehicle 200 illustrated in FIG. 2 is the same as the vehicle 100 illustrated in FIG. 1, except where specifically noted below. As illustrated in FIG. 2 of the disclosure and as a non-limiting example, the vehicle 200 does not include the use of the transfer case 110 that drivingly connects the transmission 104 to the front axle differential assembly 132 of the front axle system 112.

In accordance with the embodiment of the disclosure illustrated in FIG. 2 and as a non-limiting example, at least a portion of the end of the transmission output shaft 106, opposite the transmission 104, is drivingly connected to at least a portion of the end of the third joint assembly 154 opposite the second shaft 150 of the vehicle 200. As a result, in accordance with the embodiment of the disclosure illustrated in FIG. 2 and as a non-limiting example, the second shaft 150 of the vehicle 200 extends from the transmission output shaft 106 toward the rear axle system 114 of the vehicle 200.

It is within the scope of this disclosure and as a non-limiting example that the transmission 104 and/or the rear axle differential assembly 162 may include the use of a lubrication fluid shroud according to an embodiment of the disclosure.

Figure 3:
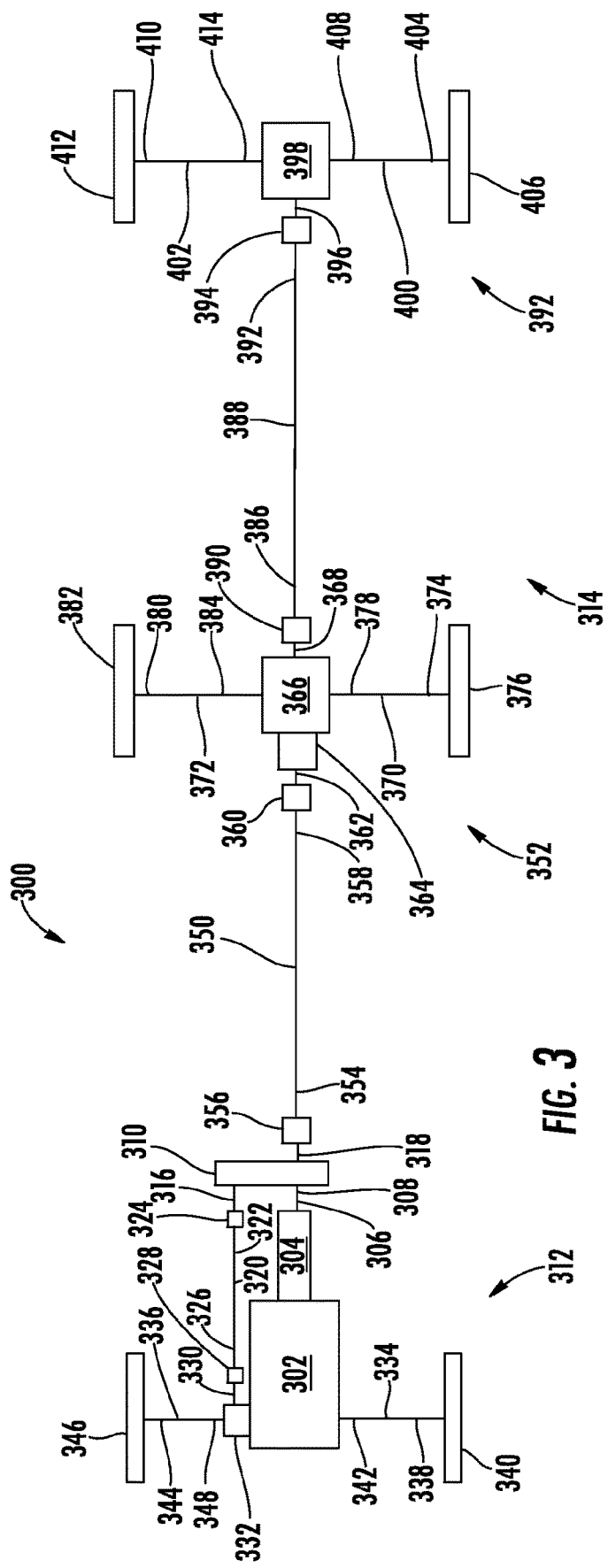
FIG. 3 is a schematic top-plan view of view of yet another vehicle having one or more lubrication fluid shrouds according to an embodiment of the disclosure.

FIG. 3 is a schematic top-plan view yet another vehicle 300 having one or more lubrication fluid shrouds according to an embodiment of the disclosure. The vehicle 300 has an engine 302, which is drivingly connected to a transmission 304. As non-limiting example, the engine 302 of the vehicle 300 may be an internal combustion engine, an electric motor, a steam turbine and/or a gas turbine. A transmission output shaft 306 is then drivingly connected to an end of the transmission 304 opposite the engine 302 of the vehicle 300. As previously discussed in relation to FIG. 1 of the disclosure, the transmission 304 is a power management system, which provides controlled application of the rotational energy generated by the engine 302 by means of a gearbox.

Drivingly connected to an end of the transmission output shaft 306, opposite the transmission 304 is a transfer case input shaft 308. As illustrated in FIG. 3 of the disclosure and as a non-limiting example, drivingly connected to an end of the transfer case input shaft 308, opposite the transmission output shaft 306, is a transfer case 310 of the vehicle 300. The transfer case 310 of the vehicle 300 allows for the selective transfer the rotational power from the transmission 304 to a front axle system 312 and a tandem axle system 314 of the vehicle 300 by utilizing a series of gears and drive shafts. As illustrated in FIG. 3 of the disclosure and as a non-limiting example, the transfer case 310 includes a first transfer case output shaft 416 and a second transfer case output shaft 318.

A first shaft 320 extends from the first transfer case output shaft 316 toward the front axle system 312 of the vehicle 300. The first shaft 320 transmits the rotational power from the transfer case 310 to the front axle system 312 of the vehicle 300 thereby drivingly connecting the transfer case 310 to the front axle system 312. It is within the scope of this disclosure and as a non-limiting example that the first shaft 320 may be a drive shaft, a prop shaft, a Cardan shaft, an axle half shaft or a differential pinion shaft.

As illustrated in FIG. 3 of the disclosure and as a non-limiting example, at least a portion of a first end portion 322 of the first shaft 320 is drivingly connected to an end of the first transfer case output shaft 316 opposite the transfer case 310 via a first joint assembly 324. Additionally, as illustrated in FIG. 3 of the disclosure and as a non-limiting example, at least a portion of a second end portion 326 of the first shaft 320 may be drivingly connected to an end of a second joint assembly 328. It is within the scope of this disclosure and as a non-limiting example that the first and/or second joint assembly 324 and/or 328 of the vehicle 300 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second joint assembly 328, opposite the first shaft 320, is a front axle input shaft 330. The front axle input shaft 330 of the vehicle 300 drivingly connects the first shaft 320 of the vehicle 300 to a front axle differential assembly 332 of the front axle system 312. In accordance with the embodiment to of the disclosure illustrated in FIG. 3 and as a non-limiting example, at least a portion of an end of the front axle system input shaft 330, opposite the first shaft 320, is drivingly connected to at least a portion of the front axle differential assembly 332. It is within the scope of this disclosure and as a non-limiting example that the front axle input shaft 330 may be a front differential input shaft, a coupling shaft, stub shaft or a front differential pinion shaft. The front axle differential assembly 332 is a set of gears that allows the outer drive wheel(s) of the vehicle 400 to rotate at a faster rate that the inner drive wheel(s). The rotational power is transmitted through the front axle system 312 as described in more detail below.

The front axle system 312 further includes a first front axle half shaft 334 and a second front axle half shaft 336. As illustrated in FIG. 3 of the disclosure and as a non-limiting example, the first front axle half shaft 334 extends substantially perpendicular to the front axle input shaft 330 of the vehicle 300. At least a portion of a first end portion 338 of the first front axle half shaft 334 is drivingly connected to a first front axle wheel assembly 340. As illustrated in FIG. 3 of the disclosure and as a non-limiting example, at least a portion of a second end portion 342 of the first front axle half shaft 334 is drivingly connected to an end of the front axle differential assembly 332. It is within the scope of this disclosure and as a non-limiting example that the second end portion 342 of the first front axle half shaft 334 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 330 is the second front axle half shaft 336 of the vehicle 300. At least a portion of a first end portion 344 of the second front axle half shaft 336 is drivingly connected to a second front axle wheel assembly 346. As illustrated in FIG. 3 of the disclosure and as a non-limiting example, at least a portion of a second end portion 348 of the second front axle half shaft 336 is drivingly connected to an end of the front axle differential assembly 332 opposite the first front axle half shaft 334. It is within the scope of this disclosure and as a non-limiting example that the second end portion 348 of the second front axle half shaft 336 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 318 is drivingly connected to an end of the transfer case 310 opposite the transfer case input shaft 308 of the vehicle 300. A second shaft 350 extends from the second transfer case output shaft 318 toward a forward tandem axle system 352 of the tandem axle system 314 of the vehicle 300. As a non-limiting example, the second shaft 350 may be a drive shaft, a propeller shaft or a Cardan shaft.

At least a portion of a first end portion 354 of the second shaft 350 is drivingly connected to an end of the second transfer case output shaft 318 opposite the transfer case 310 via a third joint assembly 356. It is within the scope of this disclosure and as a non-limiting example that the third joint assembly 356 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 3 of the disclosure and as a non-limiting example, at least a portion of a second end portion 358 of the second shaft 350 may be drivingly connected to an end of an fourth joint assembly 360. It is within the scope of this disclosure and as a non-limiting example that the fourth joint assembly 360 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth joint assembly 360, opposite the second shaft 350, is drivingly connected to at least a portion of a forward tandem axle system input shaft 362. It is within the scope of this disclosure and as a non-limiting example that the forward tandem axle input shaft 362 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 362, opposite the second shaft 350, is an inter-axle differential assembly 364 of the forward tandem axle system 352 of the vehicle 300. The inter-axle differential assembly 364 is a device that divides the rotational power generated by the engine 302 between the axles in the vehicle 300. The rotational power is transmitted through the forward tandem axle system 352 as described in more detail below.

As illustrated in FIG. 3 of the disclosure and as a non-limiting example, the inter-axle differential assembly 364 of the vehicle 300 is drivingly connected to a forward tandem axle differential assembly 366 and a forward tandem axle system output shaft 368. The forward tandem axle differential assembly 366 is a set of gears that allows the outer drive wheel(s) of the vehicle 300 to rotate at a faster rate than the inner drive wheel(s).

The forward tandem axle system 352 of the vehicle 300 further includes a first forward tandem axle half shaft 370 and a second forward tandem axle half shaft 372. As illustrated in FIG. 3 of the disclosure and as a non-limiting example, the first forward tandem axle half shaft 370 extends substantially perpendicular to the forward tandem axle input shaft 362 of the vehicle 300. At least a portion of a first end portion 374 of the first forward tandem axle half shaft 370 is drivingly connected to at least a portion of a first forward tandem axle wheel assembly 376. As illustrated in FIG. 3 of the disclosure and as a non-limiting example, at least a portion of a second end portion 378 of the first forward tandem axle half shaft 370 is drivingly connected to an end of the forward tandem axle differential assembly 366. It is within the scope of this disclosure and as a non-limiting example that the second end portion 378 of the first forward tandem axle half shaft 370 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

Extending substantially perpendicular to the forward tandem axle system input shaft 362 is the second forward tandem axle system input shaft 372. At least a portion of a first end portion 380 of the second forward tandem axle half shaft 372 is drivingly connected to at least a portion of a second forward tandem axle wheel assembly 382 of the vehicle 300. As illustrated in FIG. 3 of the disclosure and as a non-limiting example, at least a portion of a second end portion 384 of the second forward tandem axle half shaft 372 is drivingly connected to an end of the forward tandem axle differential assembly 366 opposite the first forward tandem axle half shaft 370. It is within the scope of this disclosure and as a non-limiting example that the second end portion 384 of the second forward tandem axle half shaft 372 may be drivingly connected to a forward tandem axle differential side gear, a separate stub shaft, a separate coupling shaft, a second forward tandem axle differential output shaft, a second forward tandem axle half shaft connect and disconnect assembly and/or a shaft that is formed as part of a forward tandem axle differential side gear.

On end of the forward tandem axle system output shaft 368 is drivingly connected to a side of the inter-axle differential assembly 364 opposite the forward tandem axle input shaft 362. An end of the forward tandem axle system output shaft 368, opposite the inter-axle differential assembly 364, is drivingly connected to a first end portion 386 of a third shaft 388 via a fifth coupling assembly 390. The third shaft 388 extends from the forward tandem axle system output shaft 368 toward a rear tandem axle system 392 of the tandem axle system 314 of the vehicle 300. It is within the scope of this disclosure and as a non-limiting example, that the third shaft 388 may be a drive shaft, a propeller shaft or a Cardan shaft. Additionally, it is within the scope of this disclosure and as a non-limiting example that the fifth joint assembly 390 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

At least a portion of a second end portion 392 of the third shaft 388 is drivingly connected to at least a portion of a sixth coupling assembly 394. It is within the scope of this disclosure and as a non-limiting example that the sixth joint assembly 394 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the sixth coupling assembly 394, opposite the third shaft 388, is an end of a rear tandem axle system input shaft 396. The rear tandem axle system input shaft 396 drivingly connects the inter-axle differential assembly 364 to a rear tandem axle differential assembly 398 of the rear tandem axle system 392 of the vehicle 300. As a non-limiting example, the rear tandem axle system input shaft 396 may be a rear tandem axle differential input shaft, a coupling shaft, stub shaft or a rear tandem axle differential pinion shaft. At least a portion of an end of the rear tandem axle system input shaft 396, opposite the third shaft 388, is drivingly connected to at least a portion of the rear tandem axle differential assembly 398. The rear tandem axle differential assembly 398 is a set of gears that allows the outer drive wheel(s) of the vehicle 300 to rotate at a faster rate that the inner drive wheel(s). The rotational power is transmitted through the rear tandem axle system 392 as described in more detail below.

The rear tandem axle system 392 of the vehicle 300 further includes a first rear tandem axle half shaft 400 and a second rear tandem axle half shaft 402. As illustrated in FIG. 3 of the disclosure and as a non-limiting example, the first rear tandem axle half shaft 400 extends substantially perpendicular to the rear tandem axle input shaft 396 of the vehicle 300. At least a portion of a first end portion 404 of the first rear tandem axle half shaft 400 is drivingly connected to at least a portion of a first rear tandem axle wheel assembly 406. As illustrated in FIG. 3 of the disclosure and as a non-limiting example, at least a portion of a second end portion 408 of the first rear tandem axle half shaft 400 is drivingly connected to an end of the rear tandem axle differential assembly 398. It is within the scope of this disclosure and as a non-limiting example that the second end portion 408 of the first rear tandem axle half shaft 400 may be drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

Extending substantially perpendicular to the rear tandem axle system input shaft 396 is the second rear tandem axle system input shaft 402 of the vehicle 300. At least a portion of a first end portion 410 of the second rear tandem axle half shaft 402 is drivingly connected to at least a portion of a second rear tandem axle wheel assembly 412. As illustrated in FIG. 3 of the disclosure and as a non-limiting example, at least a portion of a second end portion 414 of the second rear tandem axle half shaft 402 is drivingly connected to an end of the rear tandem axle differential assembly 398 opposite the first rear tandem axle half shaft 400. It is within the scope of this disclosure and as a non-limiting example that the second end portion 414 of the second rear tandem axle half shaft 402 may be drivingly connected to a rear tandem axle differential side gear, a separate stub shaft, a separate coupling shaft, a second rear tandem axle differential output shaft, a second rear tandem axle half shaft connect and disconnect assembly and/or a shaft that is formed as part of a rear tandem axle differential side gear.

It is within the scope of this disclosure and as a non-limiting example that the transmission 304, the transfer case 310, the front axle differential assembly 332, the inter-axle differential assembly 364, the forward tandem axle differential assembly 366 and/or the rear tandem axle differential assembly 398 may include the use of a lubrication fluid shroud according to an embodiment of the disclosure.

Figure 4:
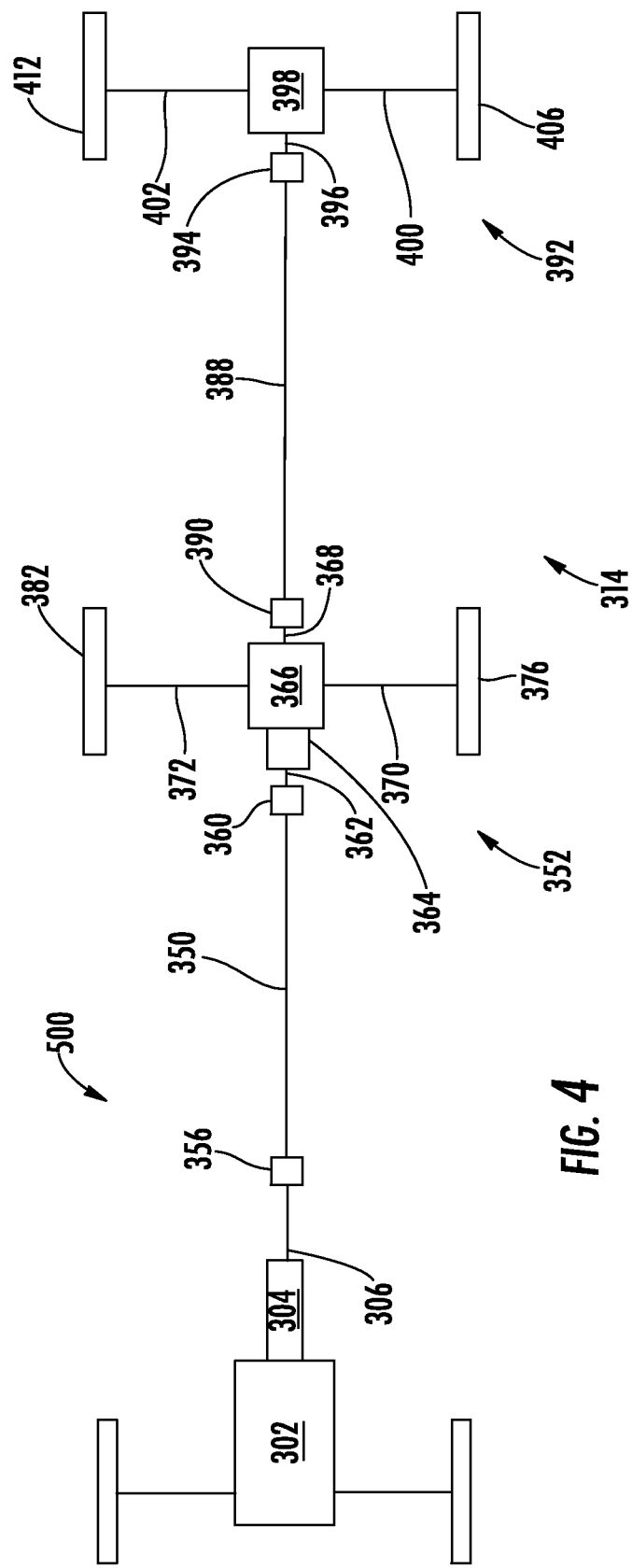
FIG. 4 is a schematic top-plan view of view of still yet another vehicle having one or more lubrication fluid shrouds according to an embodiment of the disclosure.

FIG. 4 is a schematic top-plan view of still yet another vehicle 500 having one or more lubrication fluid shrouds according to an embodiment of the disclosure. The vehicle 500 illustrated in FIG. 4 is the same as the vehicle 300 illustrated in FIG. 3, except where specifically noted below. As illustrated in FIG. 4 of the disclosure and as a non-limiting example, the vehicle 500 does not include the use of the transfer case 310 that drivingly connects the transmission 304 to the front axle differential assembly 332 of the front axle system 312.

In accordance with the embodiment of the disclosure illustrated in FIG. 4 and as a non-limiting example, at least a portion of the end of the transmission output shaft 306, opposite the transmission 304, is drivingly connected to at least a portion of an end of the third joint assembly 356 opposite the second shaft 350 of the vehicle 500. As a result, in accordance with the embodiment of the disclosure illustrated in FIG. 4 and as a non-limiting example, the second shaft 350 extends from the transmission output shaft 306 toward the forward tandem axle system 352 of a tandem axle system 314 of the vehicle 500.

It is within the scope of this disclosure and as a non-limiting example that the transmission 304, the inter-axle differential assembly 364, the forward tandem axle differential assembly 366 and/or the rear tandem axle differential assembly 398 may include the use of a lubrication fluid shroud according to an embodiment of the disclosure.

Figure 5:
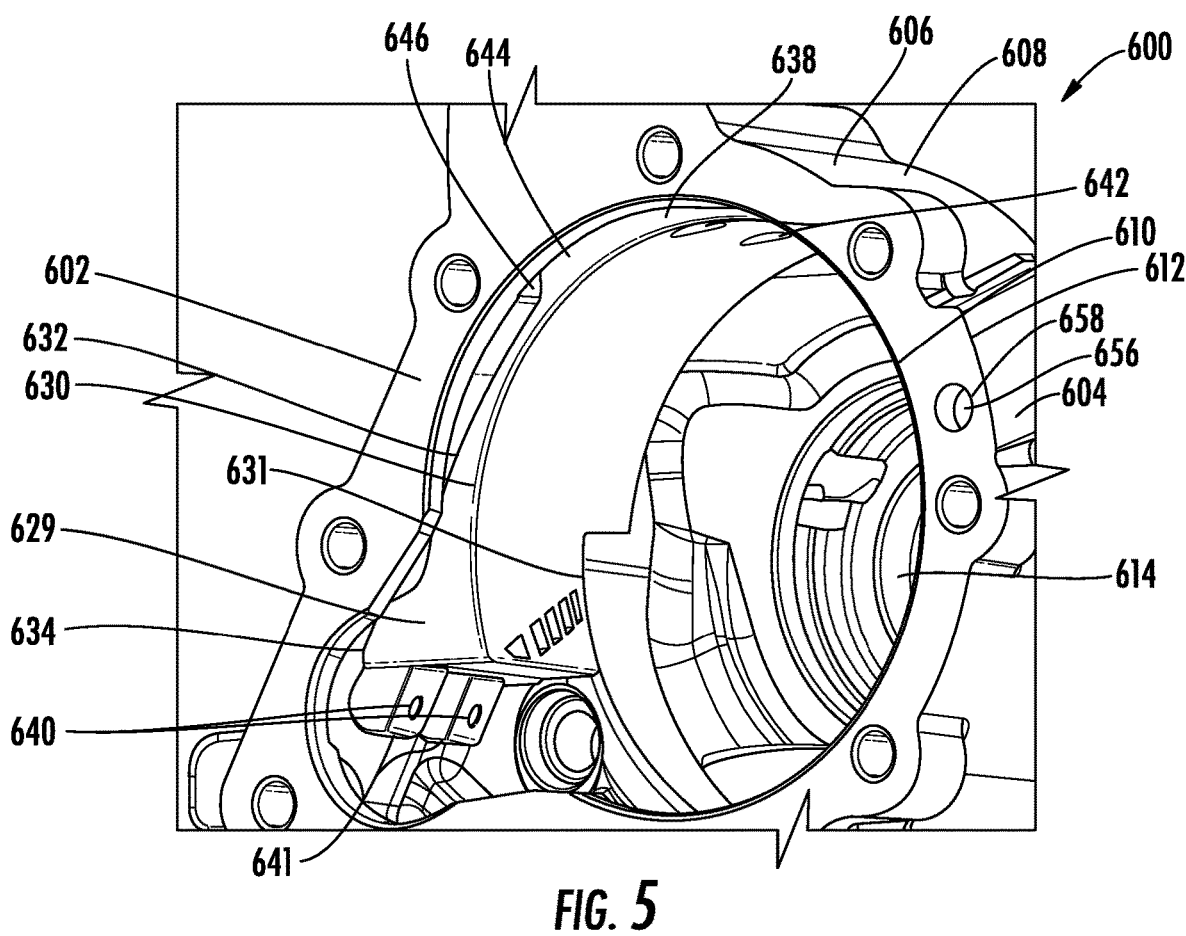
FIG. 5 is a schematic perspective view of a drive unit assembly having one or more shrouds according to an embodiment of the disclosure.
Figure 6:
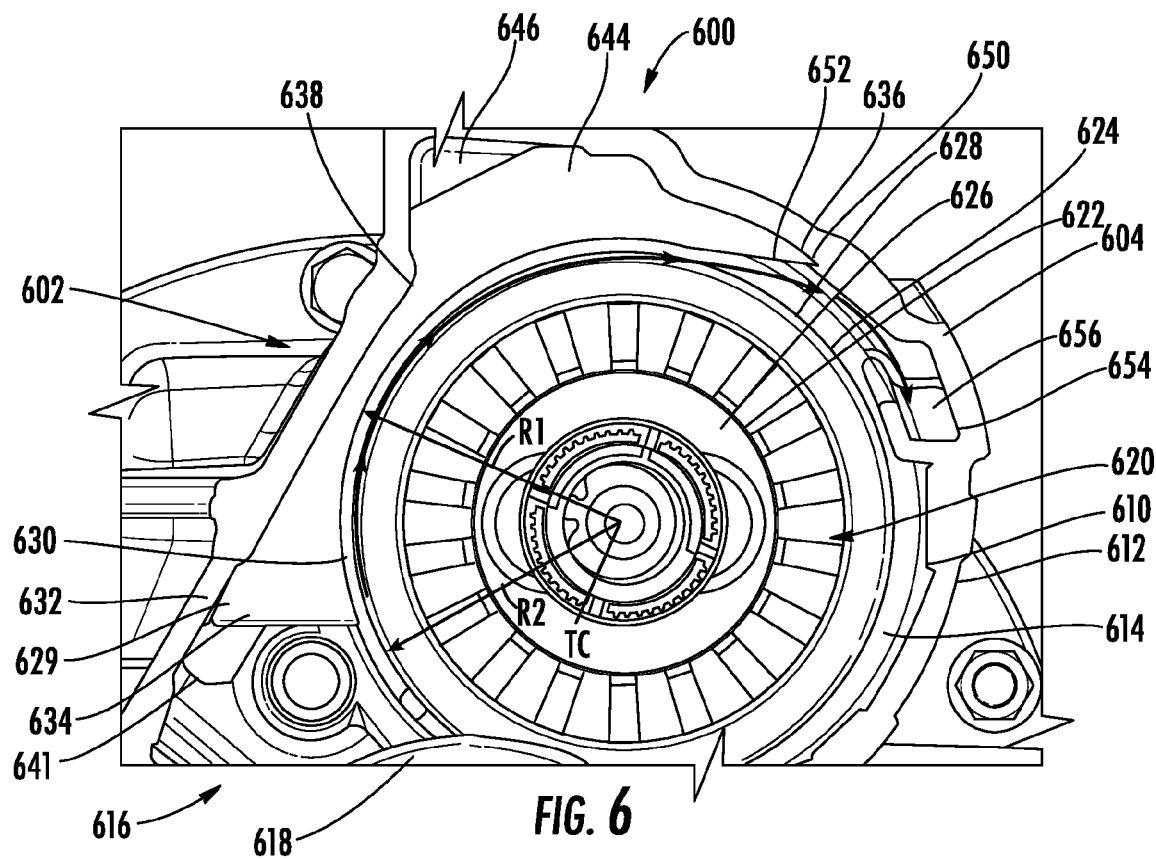
FIG. 6 is a schematic side-view a portion of the drive unit assembly and the one or more shrouds according to the embodiment illustrated in FIG. 5 of the disclosure.

FIGS. 5-10 provide a schematic illustration of a drive unit assembly 600 having a lubrication fluid shroud 602 (herein after referred to as a "shroud") according to an embodiment of the disclosure. As best seen in FIGS. 5 and 6 of the disclosure and as a non-limiting example, the drive unit assembly 600 may include a housing 604 having a first end portion 606, a second end portion 608, an inner surface 610 and an outer surface 612 defining a hollow interior portion 614 therein. The hollow interior portion 614 of the housing 604 may be of a size and shape to receive and/or retain at least a portion of gear assembly 616. It is within the scope of this disclosure and as a non-limiting example that the gear assembly 616 of the drive unit assembly 600 may be a transmission gear assembly, a differential gear assembly, a power transfer unit gear assembly, a transfer case gear assembly or an inter-axle differential gear assembly. Additionally, it is within the scope of this disclosure and as a non-limiting example that the drive unit assembly 600 may be a transmission, a differential, a power transfer unit, a transfer case or an inter-axle differential.

As best seen in FIG. 6 of the disclosure and as a non-limiting example, the gear assembly 616 of the drive unit assembly 600 may include a pinion gear 618 and/or a helical gear 620. The pinion gear 618 may be an input pinion gear that supplies the drive unit assembly 600 with an amount of rotational energy from a source of rotational power (not shown). At least a portion of the pinion gear 618 may be integrally connected to or integrally formed with an end of a pinion gear shaft (not shown). Additionally, at least a portion of the pinion gear shaft (not shown) may be rotationally supported within at least a portion of the hollow interior portion 614 of the housing 604 by using one or more bearing assemblies (not shown).

The helical gear 620 may have an inner surface 622 and an outer surface 624. At least a portion of the inner surface 614 of the helical gear 620 may be drivingly connected to at least a portion of a first shaft 626 of the drive unit assembly 600. It is within the scope of this disclosure and as a non-limiting example, that at least a portion of the first shaft 626 may be drivingly connected to at least a portion of the pinion gear 618 thereby supplying the helical gear 620 with an amount of power from the source of rotational power (not shown). As a result, it is therefore to understood that the helical gear 620 of the drive unit assembly 600 may be a utilized in order to transmit an amount of rotational power to a rear axle assembly (not shown) and/or one or more differential assemblies (not shown) drivingly connected to at least a portion of the helical gear 620.

A plurality of helical gear teeth 628 may circumferentially extend along at least a portion of the outer surface 624 of the helical gear 620. The plurality of helical gear teeth 628 may be complementary to and meshingly engaged with one or more gears or rotational components within the drive unit assembly 600 in order to provide a driving connection therebetween.

In accordance with the embodiment illustrated in FIGS. 5 and 6 of the disclosure and as a non-limiting example, at least a portion of the shroud 602 may be disposed within at least a portion of the hollow interior portion 614 of the housing 604 of the drive unit assembly 600. As best seen in FIGS. 6-9 of the disclosure and as a non-limiting example, the shroud 602 has a first side 629, a second side 631, an inner surface 630, an outer surface 632, a first end portion 634, a second end portion 636 and an intermediate portion 638 interposed between the first and second end portions 634 and 636 of the shroud 602. At least a portion of the shroud 602 of the drive unit assembly 600 may be integrally connected or attached to at least a portion of the inner surface 610 of the hollow interior portion 614 of the housing 604. It is within the scope of this disclosure and as a non-limiting example that at least a portion of the shroud 602 may be integrally or attached to at least a portion of the inner surface 610 of the housing 604 by using one or more clips, one or more adhesives, one or more welds, one or more mechanical fasteners, a staking connection, a snap-in connection, a snap-fit connection and/or any other method of securely attaching one component to another.

The shroud 602 may include one or more first shroud attachment apertures 640 that are aligned with one or more first housing attachment apertures (not shown) in the housing 604 of the drive unit assembly 600. As best seen in FIG. 5 of the disclosure and as a non-limiting example, the one or more first attachment apertures 640 may extend from the inner surface 630 to the outer surface 632 of the first end portion 634 of the shroud 602. The one or more first shroud attachment apertures 640 and/or the one or more first housing attachment apertures (not shown) may be of a size and shape to receive and/or retain at least a portion of one or more first mechanical fasteners (not shown) therein. In light of the foregoing, it is therefore to be understood that the one or more first mechanical fasteners (not shown) may be utilized in order to secure at least a portion of the first end portion 634 of the shroud 602 to at least a portion of the inner surface 610 of the housing 604.

According to the embodiment of the disclosure illustrated in FIGS. 5 and 6 of the disclosure and as a non-limiting example, the shroud 602 may include one or more attachment portions 641 extending outward from at least a portion of the first end portion 632 of the shroud 602. The one or more attachment portions 641 extending from the first end portion 632 of the shroud 602 may be of a size and shape needed in order to have at least a portion of the one or more first shroud attachment apertures 640 disposed therein.

In accordance with the embodiment illustrated in FIG. 5 of the disclosure and as a non-limiting example, the shroud 602 may include one or more second shroud attachment apertures 642 that are aligned with one or more second housing attachment apertures (not shown) in the housing 604. The one or more second shroud attachment apertures 642 may extend from the inner surface 630 to the outer surface 632 of the intermediate portion 638 and/or the second end portion 636 of the shroud 602. The one or more second shroud attachment apertures and/or the one or more second housing attachment apertures (not shown) may be of a size and shape to receive and/or retain at least a portion of one or more second mechanical fasteners (not shown) therein. In light of the foregoing, it is therefore to be understood that the one or more second mechanical fasteners (not shown) may be used in order to secure at least a portion of the intermediate and/or second end portions 638 and/or 636 of the shroud 602 to at least a portion of the inner surface 610 of the housing 604.

At least a portion of the outer surface 632 of the shroud 602 may have a shape that is complementary to at least a portion of the inner surface 610 of the housing 604. In accordance with the embodiment illustrated in FIGS. 5 and 6 of the disclosure and as a non-limiting example, the shroud 602 may include a one or more protruding portions 644 extending outward from at least a portion of the outer surface 632 of the intermediate portion 638 of the shroud 602. The one or more protruding portions 644 may have a size and shape that is complementary to at least a portion of one or more first shroud receiving portions 646 in the inner surface 610 of the housing 604. The meshing or mating relationship between the one or more protruding portions 644 of the shroud 602 and the one or more first shroud receiving portions 646 of the housing 604 aid in ensuring that the shroud 602 is secures within the housing 604 of the drive unit assembly 600.

Figure 8:
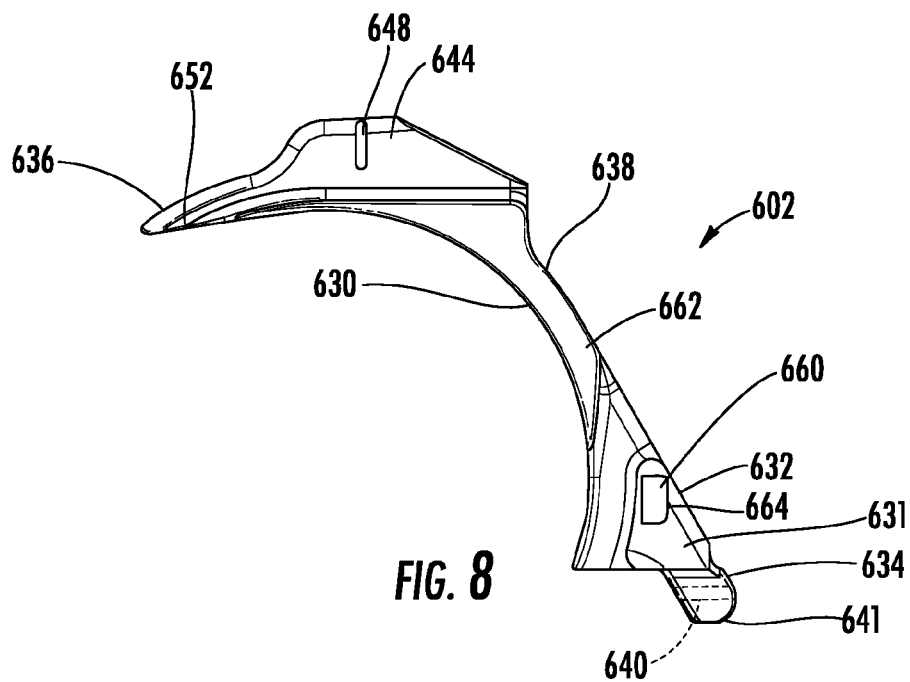
FIG. 8 is a schematic side-view of a second side of the shroud according to the embodiment illustrated in FIGS. 5-7 of the disclosure.

One or more grooves 648 may extend along at least a portion of the outer surface 632 of the one or more protruding portions 644 of the shroud 602. As best seen in FIG. 8 of the disclosure and as a non-limiting example, the one or more grooves 648 may extend in a substantially vertical manner. The one or more grooves 648 in the outer surface 632 of the one or more protruding portions 644 of the shroud may have a size and shape to receive and/or retain at least a portion of one or more ribs (not shown) extending along at least a portion of the inner surface 610 of the one or more first receiving portions 646 of the housing 604. The meshing relationship between the one or more grooves 648 and the one or more ribs (not shown) aid in ensuring that the shroud 602 is securely retained within the housing 604 of the drive unit assembly 600.

In accordance with an alternative embodiment of the disclosure (not shown) and as a non-limiting example, the one or more protruding portions 644 of the shroud 602 may include one or more ribs (not shown). It is within the scope of this disclosure and as a non-limiting example that the one or more ribs (not shown) may extend in a substantially vertical manner along the outer surface 632 of the one or more protruding portions 644 of the shroud 602. The one or more ribs (not shown) in the outer surface 632 of the one or more protruding portions 644 of the shroud 602 may have a size and shape to be received and/or retained within at least a portion of one or more grooves (not shown) in the inner surface 610 of the one or more first shroud receiving portions 646 of the housing 604. The meshing relationship between the one or more ribs (not shown) of the shroud 602 aid in ensuring that the shroud 602 is securely retained within the housing 604 of the drive unit assembly 600.

The housing 604 of the drive unit assembly 600 may include one or more second shroud receiving portions 650. The one or more second shroud receiving portions 650 may be axially off-set from the one or more first shroud receiving portions 646 in the inner surface 610 of the housing 604. As best seen in FIG. 6 of the disclosure and as a non-limiting example, the one or more second shroud receiving portions 650 may be of a size and shape to receive and/or retain at least a portion of the second end portion 636 of the shroud 602. The meshing relationship between at least a portion of the second end portion 636 of the shroud 602 and the one or more second shroud receiving portions 650 aids in ensuring that the shroud 602 is securely retained within the housing 604 of the drive unit assembly 600.

At least a portion of the inner surface 630 of the shroud 602 may have a shape that is complementary to the outermost surface 624 of the helical gear 620 of the drive unit assembly 600. As a result, it is therefore to be understood that at least a portion of the inner surface 630 of the shroud 602 is disposed directly adjacent to and outboard from at least a portion of the plurality of helical gear teeth 628 on the outer surface 624 of the helical gear 620. In light of the foregoing, it is therefore to be understood that at least a portion of the first end portion 623 and the intermediate portion 638 of the inner surface 630 of the shroud 602 may be defined by a substantially continuous radius R1 from the theoretical center TC of the helical gear 620. It is within the scope of this disclosure and as a non-limiting example, that the radius R1 of the shroud 602 may be greater than a radius R2 of the outermost surface 624 of the helical gear 620 from the theoretical center TC.

Figure 7:
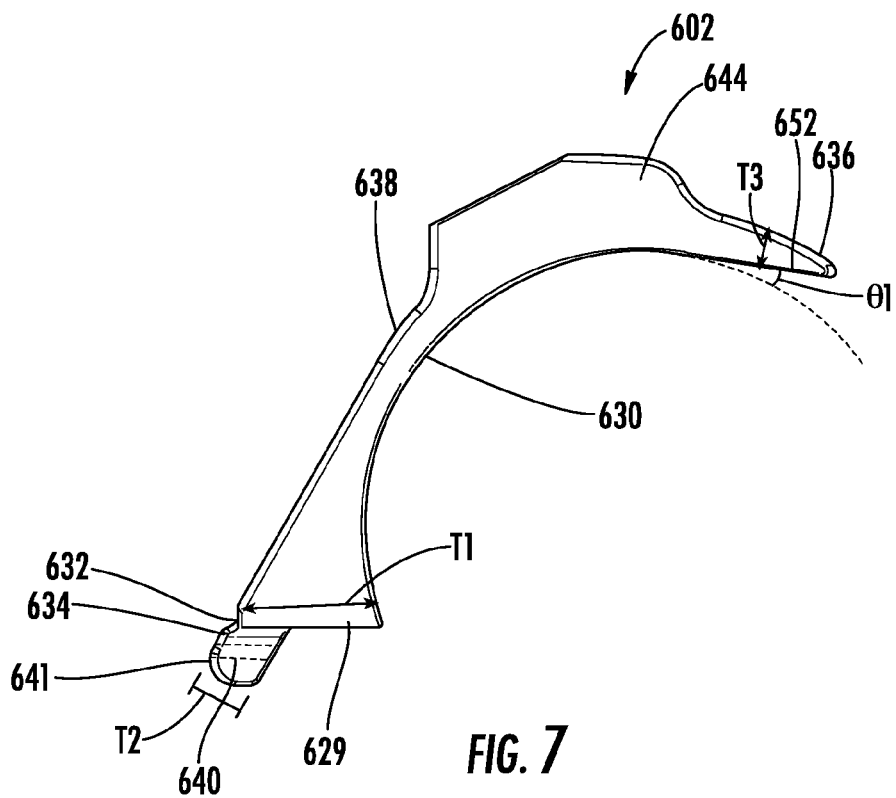
FIG. 7 is a schematic side-view of a first side of the shroud according to the embodiment illustrated in FIGS. 5 and 6 of the disclosure.

As best seen in FIGS. 6-8 of the disclosure and as a non-limiting example, the second end portion 636 of the inner surface 630 of the shroud 602 may include one or more lubricant directing portions 652. According to the embodiment illustrated in FIG. 7 of the disclosure and as a non-limiting example, the one or more lubricant directing portions 652 of the shroud 602 may extend in a substantially linear manner an angle θ1 away from the circular path created by the radius R1 of the of the shroud 602. It is within the scope of this disclosure and as a non-limiting example that the one or more lubricant directing portions 652 of the shroud 602 may extend tangentially from or be tangentially related to the portion of the inner surface 630 of the shroud 602 defined by the radius R1. While the one or more lubricant directing portions 652 illustrated in FIGS. 6-8 of the disclosure are substantially linear in shape, it is within the scope of this disclosure that the one or more lubricant directing portions 652 of the inner surface 630 of the shroud 602 may be substantially arcuate in shape.

As best seen in FIG. 7 of the disclosure and as a non-limiting example, at least a portion of the first end portion 634 of the shroud 602 may have a thickness T1 that decreases from the first end portion 634 toward the intermediate portion 638 of the shroud 602. It is within the scope of this disclosure and as a non-limiting example that the one or more attachment portions 641 of the shroud 602 may have a thickness T2 that is less than the thickness T1 of the first end portion 634 of the shroud 602. Furthermore, it is within the scope of this disclosure and as a non-limiting example that at least a portion of the second end portion 636 of the shroud 602 may have a thickness T3 that is less than the thickness T1 and/or T2 of the shroud 602.

The one or more lubricant directing portions 652 of the shroud 602 may be used in order to aid in directing an amount of lubricating fluid from a primary sump (not shown) and into a secondary reservoir 654 illustrated in FIG. 6 of the disclosure. It is within the scope of this disclosure and as a non-limiting example that the secondary reservoir 654 may be integrally formed into the inner surface 610 of the housing or integrally connected to at least a portion of the inner surface 610 of the housing 604 as a separate component. As the helical gear 620 rotates through the primary sump (not shown) within the housing 604, an amount of lubricating fluid is attracted or clings to at least a portion of the outer surface 624 of the plurality of helical gear teeth 628. The lubricating fluid on the helical gear 620 is then flung, thrown or expelled from the helical gear 620 due to the centrifugal forces exerted onto the lubricating fluid when the drive unit assembly 600 is in operation. The lubricating fluid is then flung, thrown or expelled from the helical gear 620 into contact with at least a portion of the one or more lubricant directing portions 652 of the shroud 602. Once in contact with the one or more lubricant directing portions 652 of the shroud 602, the lubricating fluid is directed into the secondary reservoir 654. The lubricating fluid collected within the secondary reservoir 654, then flows through one or more channels 656 extending in a downward angle to one or more outlets 658. As the lubricating fluid exits the one or more outlets 658 of the one or more channels 656, the lubricating fluid comes into contact with the one or more bearings (not shown) rotationally supporting the pinion gear shaft (not shown) within the housing 604. By providing the drive unit assembly 600 with the shroud 602, it allows the drive unit assembly 600 to operate with a lesser volume of lubricating fluid within the primary sump (not shown) than is conventionally needed. This aids in deceasing the overall costs and weight of the drive unit assembly 600, while at the same time, increasing the overall efficiency of the drive unit assembly 600 by minimizing or eliminating the amount of churning and/or parasitic losses typically created by the lubricating fluid and ensuring that the drive unit assembly 600 is properly lubricated at all times.

Figure 9:
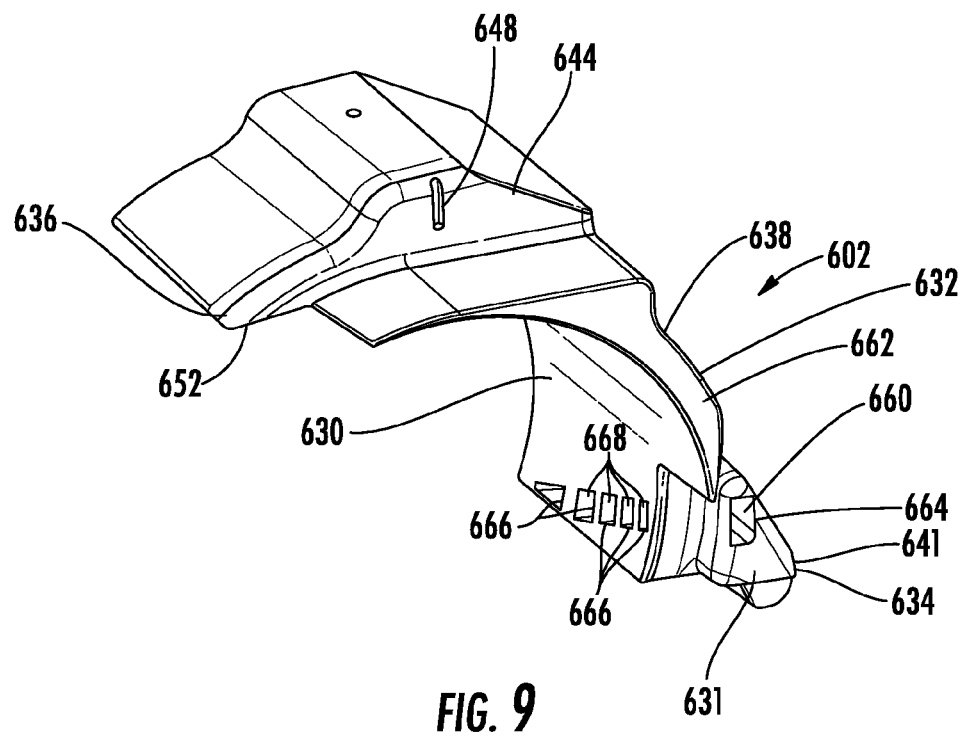
FIG. 9 is a schematic perspective view of the shroud and the one or more shroud channels within the shroud as illustrated in FIGS. 5-8 of the disclosure.
Figure 10:
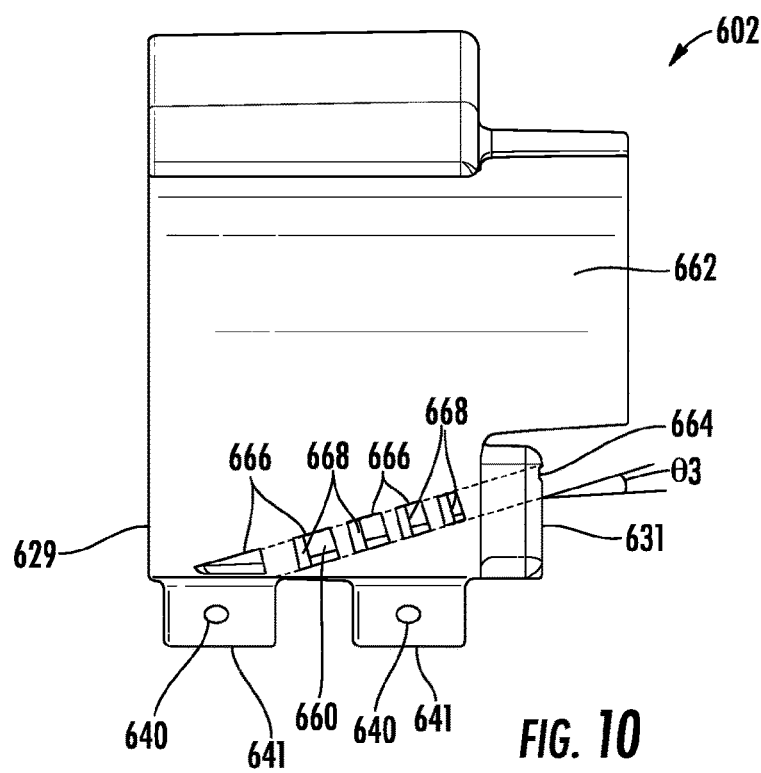
FIG. 10 is a schematic front-view of a portion of the shroud and the one or more shroud channels within the shroud as illustrated in FIGS. 5-9 of the disclosure.

According to the embodiment illustrated in FIGS. 8-10 of the disclosure and as a non-limiting example, the shroud 602 may have one or more first shroud channels 660 therein. The one or more first shroud channels 660 may be of a size and shape to receive and direct an amount of lubricating fluid toward the plurality of helical gear teeth 628 on the outer surface 624 of the helical gear 620 of the drive unit assembly 600. This aids in ensuring that the helical gear 620 and the various components of the drive unit assembly 600 connected to the helical gear 620 are properly lubricated at all times when the drive unit assembly 600 is in operation. It is within the scope of this disclosure and as a non-limiting example that the one or more first shroud channels 660 may be integrally formed within the shroud 602, cast within the shroud 602 and/or machined into the shroud 602.

As best seen in FIGS. 8 and 9 of the disclosure and as a non-limiting example, at least a portion of the one or more first shroud channels 660 extends inward into at least a portion of a body portion 662 of the shroud 602 from one or more inlet openings 664 in at least a portion of the second side 631 of the shroud 602. The one or more first shroud channels 660 may extend through at least a portion of the body portion 662 of the shroud 602 terminating in one or more outlets openings 666 in the inner surface 630 of the shroud 602. As a result, it is therefore to be understood that the one or more inlet openings 664 of the one or more first shroud channels 660 are in fluid communication with the one or more outlets openings 666 of the one or more first shroud channels 660. By providing the one or more first shroud channels 660 with more than one outlet openings 666 is aids in ensuring that the entire surface of the plurality of helical gear teeth 628 of the helical gear 620 are evenly coated with a pre-determined optimal amount of lubricating fluid at all when the drive unit assembly 600 is in operation.

In accordance with an embodiment of the disclosure and as a non-limiting example, the one or more outlets openings 666 of the one or more first shroud channels 660 may include one or more second channels 668 in order to fluidly connect the one or more outlets openings 666 with the one or more first shroud channels 660 in the shroud 602. It is within the scope of this disclosure and as a non-limiting example that the one or more second channels 668 may extend at an angle θ2 relative to the one or more first shroud channels 660 in the shroud 602. This will aid in ensuring that at least a portion of the lubricating fluid traveling through the one or more first shroud channels 660 is directed toward the one or more outlets openings 666. Additionally, it is within the scope of this disclosure and as a non-limiting example that the angle θ2 of the one or more second channels 668 may be the same or different in order to ensure that an amount of lubricating fluid is evenly distributed across the entire surface of the plurality of helical gear teeth 628. As a non-limiting example, the angle θ2 of the one or more second channels 668 may be from approximately 10° to approximately 170°.

In referencing FIGS. 9 and 10 of the disclosure and as a non-limiting example, the one or more first shroud channels 660 may extend inward into the body portion 662 of the shroud 602 from the one or more inlet openings 664 toward the one or more first attachment apertures 640 in the shroud 602. This will aid in ensuring that the lubricating fluid is directed to the helical gear 620 even when the vehicle (not shown) is driving uphill thereby ensuring proper lubrication of the helical gear 620 and the nearby components of the drive unit assembly 600 at all times when in operation. It is within the scope of this disclosure and as a non-limiting example that the one or more first shroud channels 660 may extend at a substantially constant angle inward, is a substantially arcuate manner inward and/or in a substantially helical manner inward. As a non-limiting example, the one or more first shroud channels 660 may extend inward at an angle θ3 relative to a horizontal plane intersecting the one or more first shroud channels 660. The angle θ3 may be from approximately 5° to approximately 60°.

Figure 11:
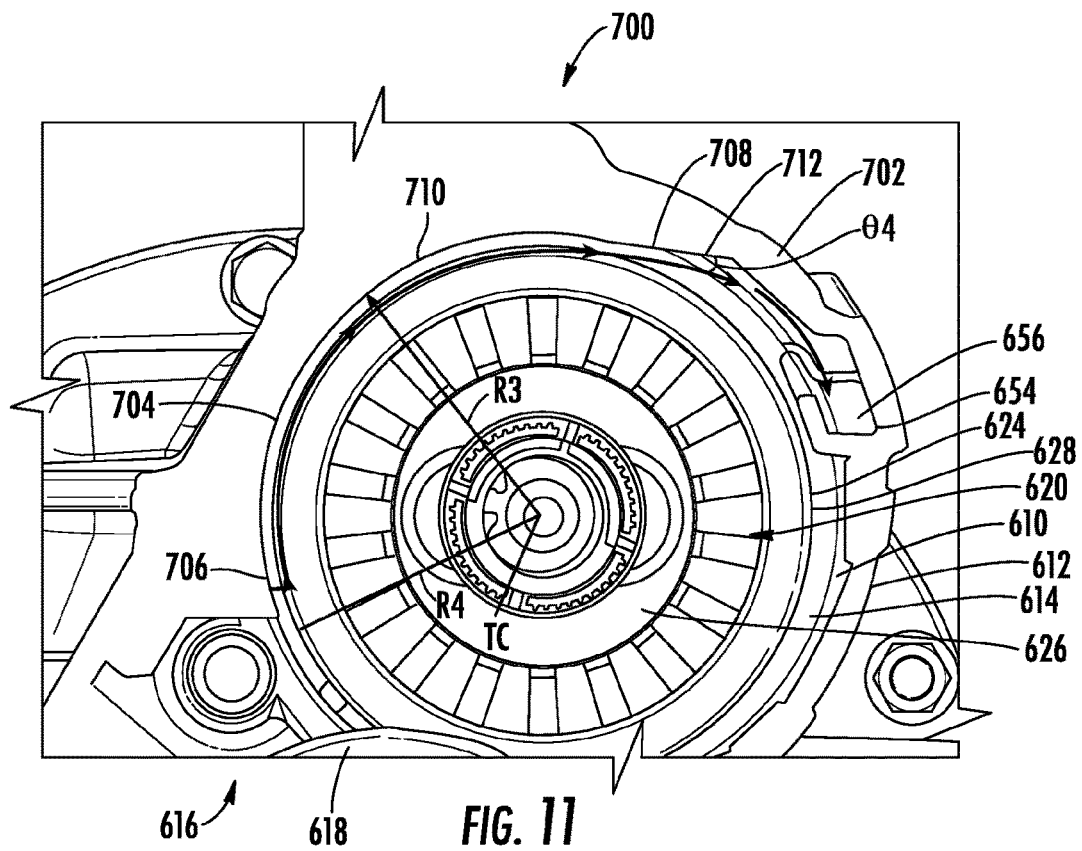
FIG. 11 is a schematic side-view of a portion of a drive unit assembly according to an alternative embodiment of the disclosure.

FIG. 11 provides a schematic side-view of a drive unit assembly 700 according to an alternative embodiment of the disclosure. The drive unit assembly 700 illustrated in FIG. 11 is the same as the drive unit assembly 600 illustrated in FIGS. 5-10, except where specifically noted below. In accordance with the embodiment illustrated in FIG. 11 of the disclosure and as a non-limiting example, the shroud described and illustrated in relation to FIGS. 5-10 may be integrally formed as part of a housing 702 of the drive unit assembly 700. This aids in reducing the overall amounts of parts and costs associated with the drive unit assembly 700.

As best seen in FIG. 11 and as a non-limiting example, at least a portion of the inner surface 610 of the housing 702 of the drive unit assembly 700 may include an integral shroud surface 704 having a first end portion 706, a second end portion 708 and an intermediate portion 710 interposed between the first and second end portions 706 and 708. At least a portion of the integral shroud surface 704 of the housing 702, may be disposed outboard from and directly adjacent to at least a portion of the plurality of helical gear teeth 628 of the helical gear 620. In light of the foregoing, it is therefore to be understood that at least a portion of the first end portion 706 and the intermediate portion 710 of the integral shroud surface 704 of the housing 702 may be defined by a substantially continuous radius R3 from the theoretical center TC of the helical gear 620. It is within the scope of this disclosure and as a non-limiting example, that the radius R3 of the integral shroud surface 704 may be greater than a radius R4 of the outermost surface 624 of the helical gear 620 from the theoretical center TC.

The second end portion 708 of the integral shroud surface 704 of the housing 702 may include one or more lubricant directing portions 712. According to the embodiment illustrated in FIG. 11 of the disclosure and as a non-limiting example, the one or more lubricant directing portions 712 of the integral shroud surface 704 may extend in a substantially linear manner an angle θ4 away from the circular path created by the radius R3 of the of the integral shroud surface 704. It is within the scope of this disclosure and as a non-limiting example that the one or more lubricant directing portions 712 of the integral shroud surface 704 may extend tangentially from or be tangentially related to the portion of the integral shroud surface 704 defined by the radius R3. While the one or more lubricant directing portions 712 illustrated in FIG. 11 of the disclosure are substantially linear in shape, it is within the scope of this disclosure that the one or more lubricant directing portions 712 of the integral shroud surface 704 of the housing 702 may be substantially arcuate in shape.

The one or more lubricant directing portions 712 of the integral shroud surface 704 may be used in order to aid in directing an amount of lubricating fluid from a primary sump (not shown) and into the secondary reservoir 654. As the helical gear 620 rotates through the primary sump (not shown) within the housing 604, an amount of lubricating fluid is attracted or clings to at least a portion of the outer surface 624 of the plurality of helical gear teeth 628. The lubricating fluid on the helical gear 620 is then flung, thrown or expelled from the helical gear 620 due to the centrifugal forces exerted onto the lubricating fluid when the drive unit assembly 700 is in operation. The lubricating fluid is then flung, thrown or expelled from the helical gear 620 into contact with at least a portion of the one or more lubricant directing portions 712 integral shroud surface 704. Once in contact with the one or more lubricant directing portions 712 integral shroud surface 704, the lubricating fluid is directed into the secondary reservoir 654. The lubricating fluid collected within the secondary reservoir 654, then flows through one or more channels 656 extending in a downward angle to one or more outlets 658. As the lubricating fluid exits the one or more outlets 658 of the one or more channels 656, the lubricating fluid comes into contact with the one or more bearings (not shown) rotationally supporting the pinion gear shaft (not shown) within the housing 604. By providing the drive unit assembly 700 with the housing 702 with the integral shroud surface 704, it allows the drive unit assembly 700 to operate with a lesser volume of lubricating fluid within the primary sump (not shown) than is conventionally needed. This aids in deceasing the overall costs and weight of the drive unit assembly 700, while at the same time, increasing the overall efficiency of the drive unit assembly 700 by minimizing or eliminating the amount of churning and/or parasitic losses typically created by the lubricating fluid and ensuring that the drive unit assembly 700 is properly lubricated at all times.

In accordance with the embodiment of the disclosure illustrated in FIG. 11 of the disclosure and as a non-limiting example, the one or more shroud channels 660 described and illustrated in relation to FIGS. 5-10 of the disclosure may be disposed within at least a portion of the housing 702. As a result, it is therefore to be understood that the one or more inlet openings 664 may be in the inner surface 610 of the housing 704 proximate the integral shroud surface 704 and the one or more shroud channels 660 may extend inward as described previously herein to the one or more outlet openings 666 in the integral shroud surface 704 of the housing 702.

Figure 12:
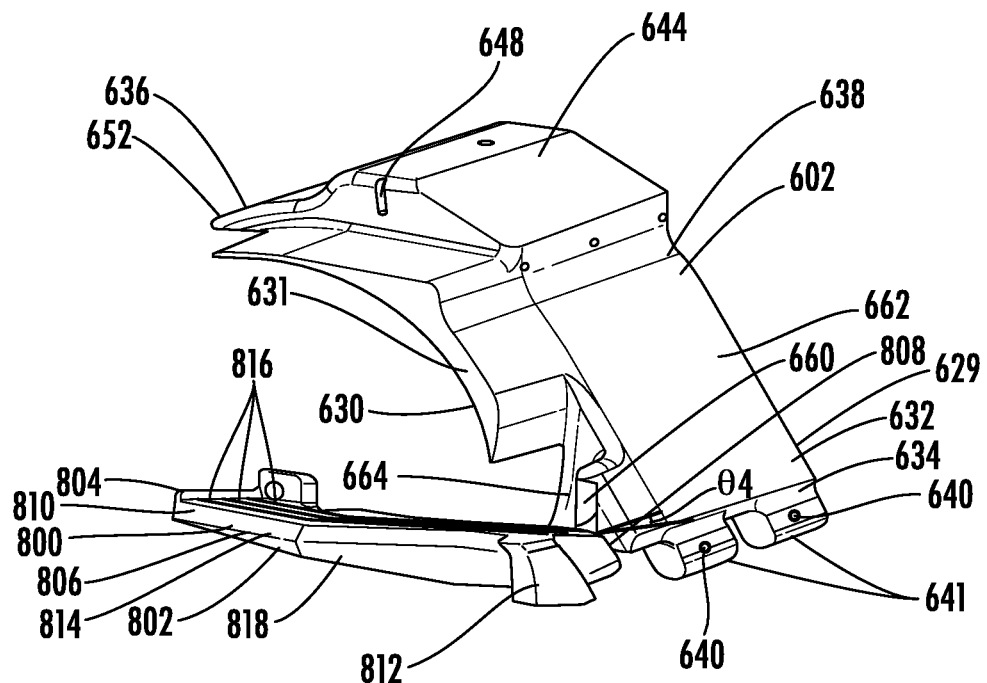
FIG. 12 is a schematic perspective view of the shroud illustrated in FIGS. 5-10 of the disclosure having a collector according to an embodiment of the disclosure.
Figure 13:
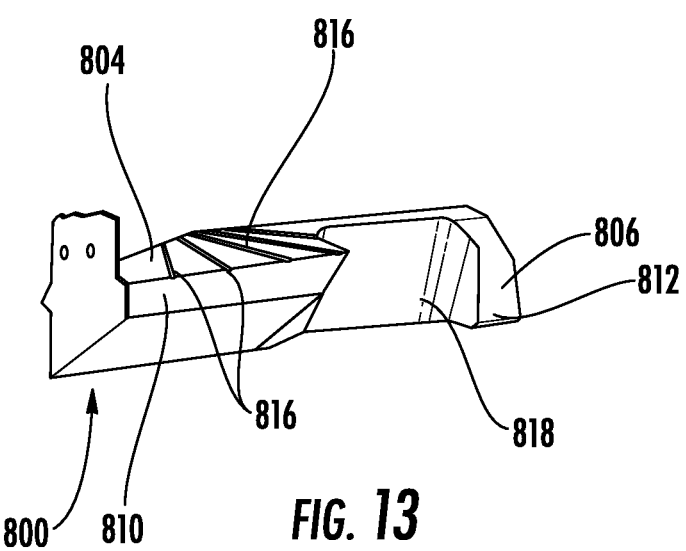
FIG. 13 is a schematic illustration of the collector illustrated in FIG. 12 of the disclosure.

FIGS. 12 and 13 provide a schematic illustration of the shroud 602 and a collector 800 according to an embodiment of the disclosure. The shroud 602 illustrated in FIG. 12 is the same as the shroud 602 described and illustrated in relation to FIGS. 5-10 of the disclosure. As best seen in FIG. 12 of the disclosure and as a non-limiting example, the collector 800 has an inner surface 802, an outer surface 804, a first side, 806, a second side 808, a first end portion 810, a second end portion 812 and an intermediate portion 814 interposed between the first and second end portions 810 and 812. It is within the scope of this disclosure and as a non-limiting example that the collector may be integrally formed as part of the shroud 602, integrally formed as part of the housing 604, 702 or connected to at least a portion of the housing 604, 702. In accordance with the embodiment where the collector 800 is a separate component connected to at least a portion of the housing 604, 702 of the drive unit assembly 600, 700, at least a portion of the collector 800 may be connected to at least a portion of the inner surface 610 of the housing 604, 702 by using one or more clips, one or more adhesives, one or more welds, one or more mechanical fasteners, a staking connection, a snap-in connection, a snap-fit connection and/or any other method of securely attaching one component to another.

In accordance with the embodiment illustrated in FIG. 12 of the disclosure and as a non-limiting example, at least a portion of the collector 800 may disposed in contact with and directly adjacent to at least a portion of the second side 631 of the shroud 602. Additionally, according to the embodiment illustrated in FIG. 12 and as a non-limiting example, at least a portion of the collector 800 may be disposed directly adjacent to at least a portion of the one or more inlet openings 664 of the one or more first shroud channels 660 within the shroud 602. This aids in allowing the collector 800 to direct an amount of lubricating fluid toward and into the one or more first shroud channels 660 within the shroud 602. As a result, in light of the foregoing, it is therefore to be understood that the collector 800 aids in collecting and/or supplying an amount of lubricating fluid to the one or more first shroud channels 660.

One or more collector grooves 816 may extend along at least a portion of the outer surface 804 of the collector 800. As best seen in FIGS. 12 and 13 of the disclosure and as a non-limiting example, the one or more collector grooves 816 of the collector may extend toward the one or more inlet openings 664 of the one or more first shroud channels 660 within the shroud 602. This aids in directing the amount of lubricating fluid collected by the collector 800 toward the one or more first shroud channels 660 of the shroud 602.

It is within the scope of this disclosure and as a non-limiting example that the outer surface 804 of the collector 800 may extend inward at an angle θ4 relative to a horizontal plane intersecting the outer surface 804 of the collector 800. This may aid in ensuring a pre-determined amount of lubricating fluid collected by the collector 800 is directed to the one or more first shroud channels 660 within the shroud 602. As a non-limiting example, the angle θ4 may be from approximately 5° to approximately 50°.

According to the embodiment illustrated in FIGS. 12 and 13 of the disclosure and as a non-limiting example, the collector 800 may include one or more gear receiving portions 818. The one or more gear receiving portions 818 of the collector 800 may extend inward into the collector from at least a portion of said second end portion 812 of said first side 806 of said collector 800. The one or more gear receiving portions 818 of the collector 800 may have a size and shape to receive at least a portion of a gear (not shown) therein. It is within the scope of this disclosure and as a non-limiting example that the gear (not shown) received within the gear receiving portion 818 of the collector 800 may be a ring gear.

As the gear (not shown) rotates, an amount of lubricating fluid is attracted to or clings to at least a portion of a plurality of gear teeth (not shown) on the gear (not shown). The lubricating fluid on the gear (not shown) is then flung, thrown or expelled from the gear (not shown) due to the centrifugal forces exerted onto the lubricating fluid when the drive unit assembly 600 is in operation. The lubricating fluid flung, thrown or expelled from the gear (not shown) is then collected on the outer surface 804 of the collector 800. Once in contact with the outer surface 804 of the collector 800, the lubricating fluid is directed toward the one or more inlet openings 664 of the one or more first shroud channels 660 in the shroud 602. As a result, in light of the foregoing, the collector 800 aids in ensuring that a substantially constant pre-determined optimal amount of lubricating fluid is supplied to the one or more first shroud channels 660 in the shroud 602. By providing the drive unit assembly 600 with the shroud 602 and the collector 800, it allows the drive unit assembly 600 to operate with a lesser volume of lubricating fluid within the primary sump (not shown) than is conventionally needed. This aids in deceasing the overall costs and weight of the drive unit assembly 600, while at the same time, increasing the overall efficiency of the drive unit assembly 600 by minimizing or eliminating the amount of churning and/or parasitic losses typically created by the lubricating fluid and ensuring that the drive unit assembly 600 is properly lubricated at all times.

FIGS. 14-17 provide a schematic illustration of a lubricant collector 900 according to an embodiment of the disclosure. The lubricant collector 900 illustrated in FIGS. 14-17 is the same as the collector 800 illustrated in FIGS. 12 and 13, except where specifically noted below. As illustrated in FIGS. 14-17 of the disclosure and as a non-limiting example, at least a portion of the lubricant collector 900 may be disposed proximate and directly adjacent to at least a portion of the ring gear 902 of the drive unit assembly 600. The lubricant collector 900 may be used in order to collect an amount of lubricating fluid (not shown) flung, thrown or expelled from the ring gear 902 when the drive unit assembly 600 is in operation. It is within the scope of this disclosure and as a non-limiting example that the lubricant collector 900 may be integrally formed as part of the housing 604 of the drive unit assembly 600 or integrally connected to at least a portion of the housing 604.

Figure 16:
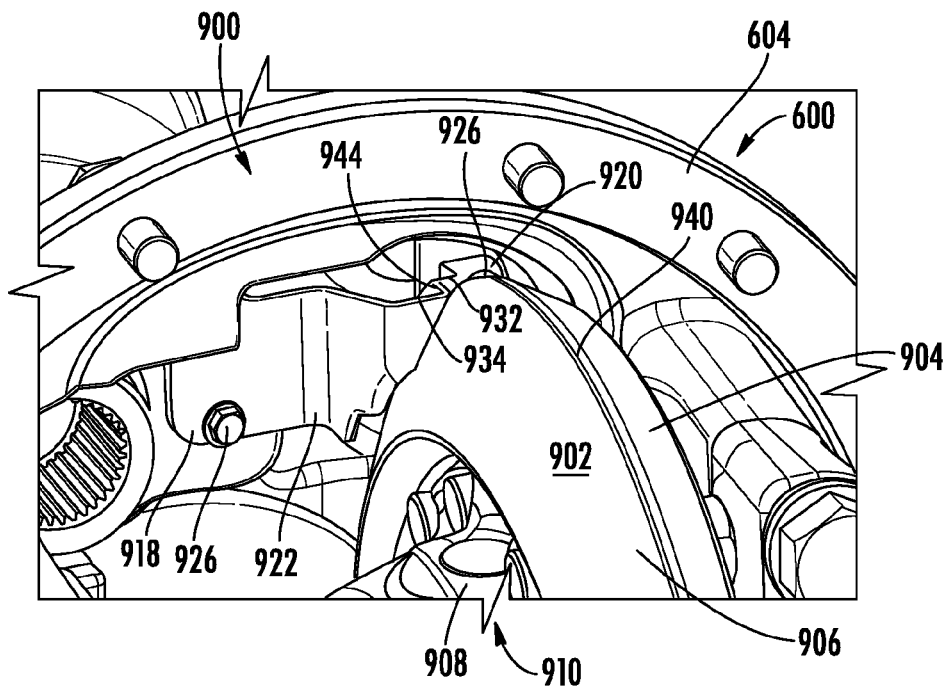
FIG. 16 is a schematic perspective view of the drive unit assembly illustrated in FIGS. 5, 6, and 11 having the lubricant collector illustrated in FIGS. 14 and 15 of the disclosure.
Figure 17:
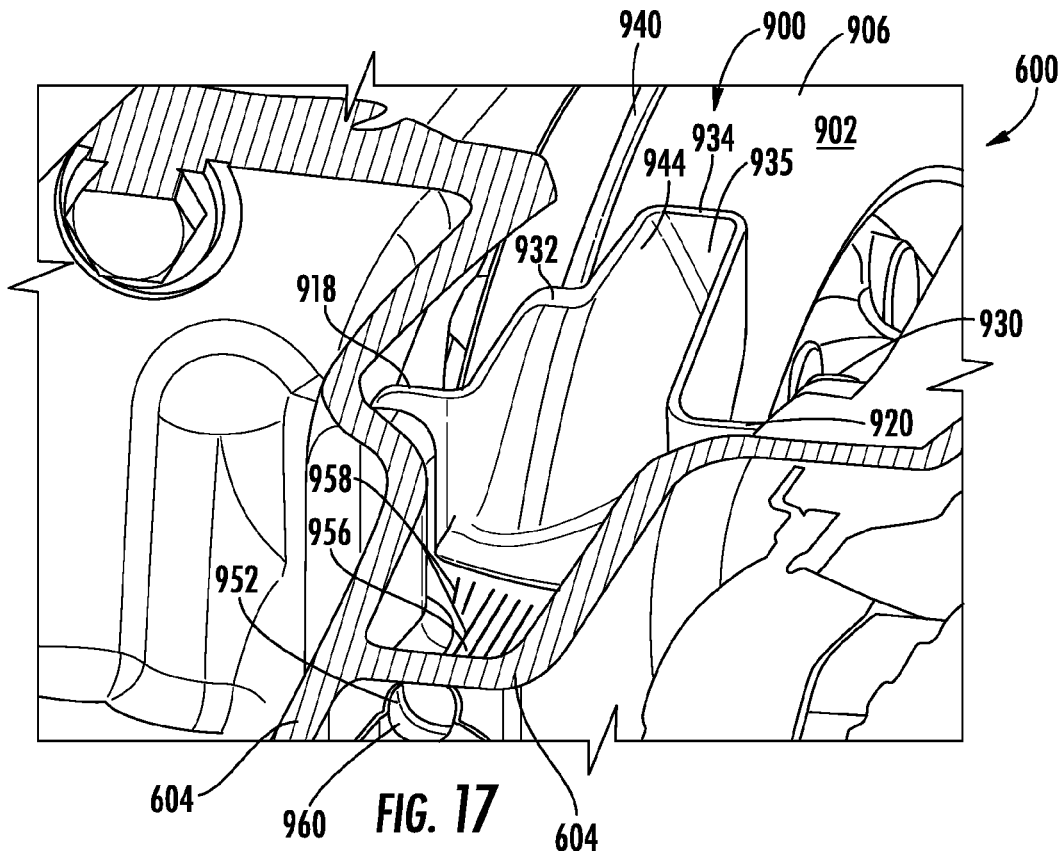
FIG. 17 is a schematic perspective view of the drive unit assembly illustrated in FIGS. 5, 6, 11 and 16 having the lubricant collector illustrated in FIGS. 14-16 of the disclosure.

As best seen in FIGS. 16 and 17 of the disclosure and as a non-limiting example, the ring gear 902 of the drive unit assembly 600 may have an outer surface 904 having a plurality of ring gear teeth 906 extending therefrom. The plurality of ring gear teeth 906 of the ring gear 902 may be complementary to and meshingly engaged with a plurality of pinion gear teeth (not shown) extending from a pinion gear (not shown) of the drive unit assembly 600. At least a portion of the ring gear 902 may be integrally formed as part of or integrally connected to at least a portion of a differential case 908 of a differential assembly 910 of the drive unit assembly 600.

Figure 14:
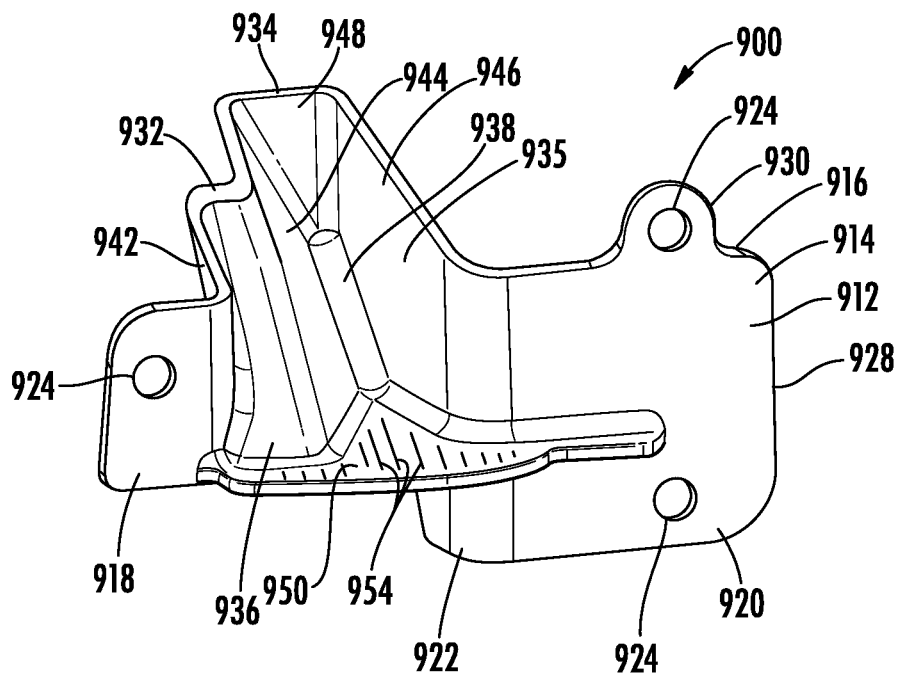
FIG. 14 is a schematic perspective front view of a lubricant collector according to an alternative embodiment of the disclosure.
Figure 15:
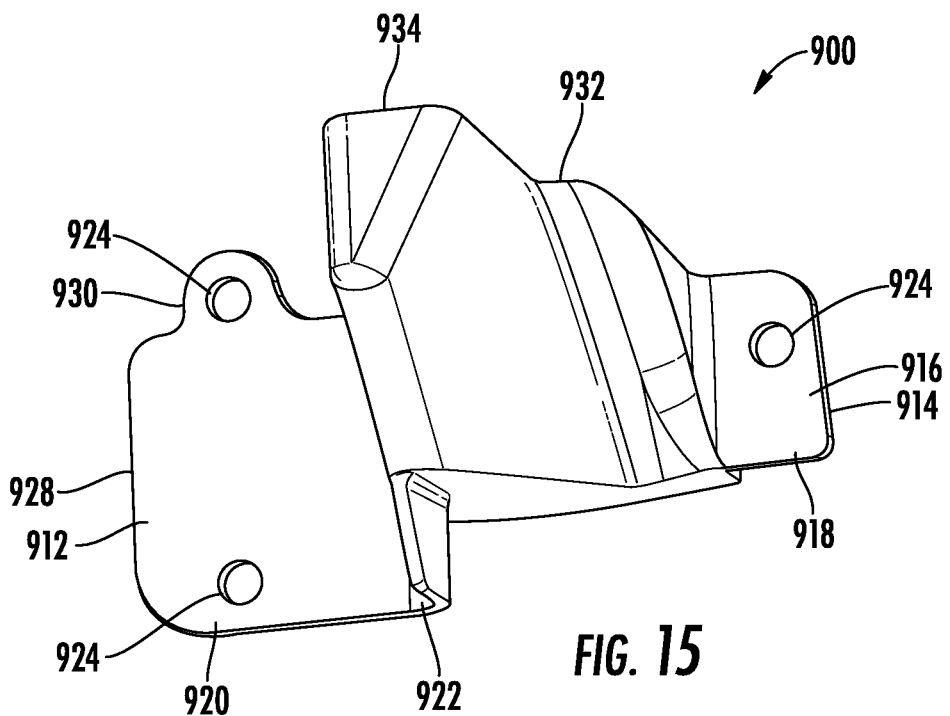
FIG. 15 is a schematic perspective rear view of the lubricant collector according to the embodiment illustrated in FIG. 14 of the disclosure.

In accordance with the embodiment illustrated in FIGS. 14 and 15 and as a non-limiting example, the lubricant collector 900 may have a body portion 912 having a first side 914, a second side 916, a first end portion 918, a second end portion 920 and an intermediate portion 922 interposed between the first and second end portions 918 and 920. The body portion 912 of the lubricant collector 900 may include one or more attachment apertures 924 extending from a first side 914 to a second side 916 of the body portion 912 of the lubricant collector 900. The one or more attachment apertures 924 may be is a size and shape to receive and/or retain at least a portion of one or more mechanical fasteners 926 therein. While the lubricant collector 900 illustrated in FIGS. 16 and 17 is connected to the housing 604 of the drive unit assembly 600 by using one or more mechanical fasteners 926, it is within the scope of this disclosure and as a non-limiting example that the lubricant collector 900 may be connected to the housing 604 by using one or more adhesives, a press-fit connection, one or more clips, one or more welds, a staking connection, a snap-in connection, a snap-fit connection and/or any other method of securely attaching one component to another. As a result, in light of the foregoing, it is therefore to be understood that the one or more attachment apertures 924 may provide a region for receiving an amount of adhesive, one or more clips, one or more snaps, one or more stakings and/or one or more welds therein.

The body portion 912 of the lubricant collector 900 may include one or more attachment portions 930. As best seen in FIGS. 14 and 15 of the disclosure and as a non-limiting example, at least a portion of the one or more attachment portions 930 may extend outward from at least a portion of an outer periphery 928 of the body portion 912 of the lubricant collector 900. At least a portion of one or more of the one or more attachment apertures 924 may be disposed within at least a portion of the one or more attachment portions 930 of the lubricant collector 900.

Extending outward from at least a portion of the intermediate portion 922 of the body portion 912 of the lubricant collector 900 is one or more first receiving portions 932 and/or one or more second receiving portions 934 defining a collector reservoir 935 therein. The one or more first receiving portions 932, the one or more second receiving portions 934 and/or the collector reservoir 935 may be of a size and shape needed to receive, collect, retain and/or direct the flow of an amount of lubricating fluid (not shown) that is flung, thrown or expelled from the ring gear 902 when the drive unit assembly 600 is in operation. As illustrated in FIGS. 14-17 of the disclosure and as a non-limiting example, at least a portion of the one or more first and/or second receiving portions 932 and/or 934 may extend outward from at least a portion of the second side 916 of the body portion 912 of the lubricant collector 900.

The one or more first receiving portions 932 of the lubricant collector 900 may include a first bottom portion 936. At least a portion of the first bottom portion 936 may extend in a downward manner into the collector reservoir 935 thereby ensuring that an amount of lubricating fluid (not shown) is feed to the collector reservoir 935 even when the vehicle (not shown) is driving uphill. As best seen in FIGS. 16 and 17 of the disclosure and as a non-limiting example, at least a portion of the first bottom portion 936 of the one or more first receiving portions 932 may be disposed outboard from and directly adjacent to at least a portion of a radially outermost surface 940 of the ring gear 902. It is therefore within the scope of this disclosure and as a non-limiting example that at least a portion of the first bottom portion 936 of the one or more first receiving portions 932 may be substantially arcuate or circular in shape. As a non-limiting example, the first bottom portion 936 of the one or more first receiving portions 932 may have a shape that is defined by a radius that is greater than a radius of the radially outermost surface 940 of the ring gear 902 of the drive unit assembly 600 from a theoretical center of the ring gear 902.

At least a portion of one or more first wall portions 942 may extend from the outer periphery 928 of the body portion 912 of the lubricant collector 900 to at least a portion of the first bottom portion 932 of the one or more first receiving portions 932. The one or more first wall portions 942 of the one or more first receiving portions 932 may extend at an angle $\theta5$ relative to a plane extending substantially parallel to the body portion 912 of the lubricant collector 900. It is within the scope of this disclosure and as a non-limiting example that the angle $\theta5$ may be from approximately 5° to approximately 90°.

In accordance with the embodiment illustrated in FIG. 14 of the disclosure and as a non-limiting example, the one or more second receiving portions 934 may include a second bottom portion 938, one or more second wall portions 944, one or more third wall portions 946 and/or one or more fourth wall portions 948. At least a portion of the second bottom portion 938 of the lubricant collector 900 may extend in a downward manner into the collector reservoir 935 thereby ensuring that an amount of lubricating fluid (not shown) is feed to the collector reservoir 935 even when the vehicle (not shown) is driving uphill.

At least a portion of the one or more second, third and/or fourth wall portions 944, 946 and/or 948 may extend inward from at least a portion of the body portion 912 of the lubricant collector 900 to the second bottom portion 938 of the one or more second receiving portions 934. As best seen in FIG. 14 and as a non-limiting example, at least a portion of the one or more second wall portions 944 of the one or more second receive portions 934 may extend outward from at least a portion of the first bottom portion 936 of the one or more first receiving portions 932 to at least a portion of the second bottom portion 938 of the one or more second receiving portions 934. It is therefore to be understood that at least a portion of the second bottom portion 938 of the one or more second receiving portions 934 may be disposed outboard and off-set from at least a portion of the first bottom portion 936 of the one or more first receiving portions 932 of the lubricant collector 900.

According to the embodiment illustrated in FIGS. 16 and 17 and as a non-limiting example, at least a portion of the one or more second wall portions 944 of the one or more second receiving portions 934 may be disposed outboard from and directly adjacent to at least a portion of the plurality of ring gear teeth 906 of the ring gear 902. As a result, the one or more second wall portions 944 of the one or more second receiving portions 934 may have a shape that is complementary to at least a portion of the plurality of ring gear teeth 906. It is therefore within the scope of this disclosure and as a non-limiting example that the one or more second wall portions 944 of the one or more second receiving portions 934 may extend at an angle $\theta6$ relative to a plane extending substantially perpendicular to the body portion 912 and/or in a substantially arcuate manner. As a non-limiting example, the angle $\theta6$ may be from approximately 5° to approximately 90°.

The one or more third and/or fourth wall portions 946 and/or 948 of the one or more second receiving portions 934 may extend from the outer periphery 928 of the body portion 912 to the second bottom portion 938 of the one or more second receiving portions 934 of the lubricant collector 900. It is within the scope of this disclosure and as a non-limiting example that the one or more third and/or fourth wall portions 946 and/or 948 may extend at an angle $\theta7$ relative to the plane extending substantially perpendicular to the body portion 912 of the lubricant collector 900. As a non-limiting example, the angle $\theta7$ may be from approximately 5° to approximately 90°.

In accordance with an embodiment of the disclosure and as a non-limiting example, the first bottom portion 936, the one or more first wall portions 942, the second bottom portion 938, the one or more second wall portions 944, the one or more third wall portions 946 and/or the one or more fourth wall portions 948 of the lubricant collector 900 may be solid. According to an alternative embodiment of the disclosure and as a non-limiting example, the first bottom portion 936, the one or more first wall portions 942, the second bottom portion 938, the one or more second wall portions 944, the one or more third wall portions 946 and/or the one or more fourth wall portions 948 of the lubricant collector 900 may have one or more apertures (not shown) therein. The one or more apertures (not shown) may be used in order to distribute an amount of lubricating fluid (not shown) collected by the lubricant collector 900 as needed throughout the drive unit assembly 600.

As best seen in FIGS. 14 and 17 of the disclosure and as a non-limiting example, at least a portion of the first bottom portion 936, the second bottom portion 938, the one or more first wall portions 942, the one or more second wall portions 944 and/or the one or more third wall portions 946 of the lubricant collector 900 may terminate at one or more directing surfaces 950. The one or more directing surfaces 950 may extend outward from at least a portion of the first bottom portion 936, the second bottom portion 938, the one or more first wall portions 942, the one or more second wall portions 944, the one or more third wall portions 946 and/or the first side 914 of the body portion 912 of the lubricant collector 900 toward one or more openings 952. It is within the scope of this disclosure and as a non-limiting example that the one or more directing surfaces 950 of the collector may extend at an angle θ8 relative to the plane extending substantially perpendicular to the body portion 912 of the lubricant collector 900. As a non-limiting example, the angle θ8 may be approximately 0° to approximately 45°. In light of the foregoing, it is therefore to be understood that the one or more directing surfaces 950 may extend substantially perpendicularly relative to the body portion 950 of the lubricant collector 900.

According to an embodiment of the disclosure and as a non-limiting example, at least a portion of the one or more directing surfaces 950 may extend upward at the angle θ8. As a result, the collector reservoir 935 of the lubricant collector 900 will be able to retain a pre-determined optimal amount of lubricating fluid therein thereby providing the drive unit assembly 600 with a secondary or tertiary reservoir. This will aid in ensuring that the lubricant collector 900 collects and/or directs a pre-determined optimal amount of lubricating fluid (not shown) to the various components of the drive unit assembly 600 at all times when in operation. Additionally, this will add in allowing the collector reservoir 935 of the lubricant collector 900 to receive and retain an amount of debris and/or wear particles created by the drive unit assembly and carried by the lubricating fluid therein. By reducing the overall amount of debris and/or wear particles that contact the various meshing components of the drive unit assembly 600, it aids in increasing the overall life and durability of the drive unit assembly 600.

In accordance with an alternative embodiment of the disclosure and as a non-limiting example, at least a portion of the one or more directing surfaces may extend downward at the angle θ8. As a result, all of the lubricating fluid (not shown) collected by the lubricant collector 900 within the collector reservoir 935 is constantly directed toward the one or more openings 952 and only a minimal amount of lubricating fluid is retained within the collector reservoir 935 of the lubricant collector 900.

The one or more directing surfaces 950 of the lubricant collector 900 may include one or more surface features 954 extending long at least a portion of an outer surface thereof. The one or more surface features 954 on the outer surface of the one or more directing surfaces 950 may be used in order to quickly and efficiently direct an amount of lubricating fluid (not shown) from the lubricant collector 900 to the one or more openings 952. Additionally, the one or more surface features 954 may be used in order to trap an amount of debris and/or wear particles carried by the lubricating fluid (not shown) therein. This aids in limiting the overall amount of debris and/or wear particles that contact the various meshing components of the drive unit assembly 600 thereby aiding in increasing the overall life and durability of the drive unit assembly 600. It is within the scope of this disclosure and as a non-limiting example that the one or more surface features 954 of the one or more directing surfaces 950 may be one or more grooves, one or more channels, one or more ribs, and/or one or more areas of increased material thickness.

According to an embodiment of the disclosure and as a non-limiting example, at least a portion of an outermost end of the one or more directing surfaces 950 of the lubricant collector 900 may be disposed proximate to and directly adjacent to at least a portion of the one or more openings 952 in the housing 604 of the drive unit assembly. As best seen in FIG. 17 and as a non-limiting example, at least a portion of one or more lubricant flow surfaces 956 may be interposed between at least a portion of the one or more directing surfaces 950 of the lubricant collector 900 and the one or more openings 952 in the housing 604 of the drive unit assembly 600. The one or more lubricant flow surfaces may be used in order to direct an amount of lubricating fluid (not shown) from the lubricant collector 900 to the one or more openings 952 in the housing 604. It is within the scope of this disclosure and as a non-limiting example, that the one or more lubricant flow surfaces 956 may be integrally formed as part of the housing 604 of the drive unit assembly 600.

The one or more lubricant flow surfaces 956 of the housing 604 may include one or more surface features 958 extending long at least a portion of an outer surface thereof. The one or more surface features 958 on the outer surface of the one or more lubricant flow surfaces 956 of the housing 604 may be used in order to quickly and efficiently direct an amount of lubricating fluid (not shown) from the lubricant collector 900 to the one or more openings 952. Additionally, the one or more surface features 958 may be used in order to trap an amount of debris and/or wear particles carried by the lubricating fluid (not shown) therein. This aids in limiting the overall amount of debris and/or wear particles that contact the various meshing components of the drive unit assembly 600 thereby aiding in increasing the overall life and durability of the drive unit assembly 600. It is within the scope of this disclosure and as a non-limiting example that the one or more surface features 958 of the one or more lubricant flow surfaces 956 may be one or more grooves, one or more channels, one or more ribs, and/or one or more areas of increased material thickness.

In accordance with the embodiment illustrated in FIG. 17 and as a non-limiting example that when assembled, at least a portion of the one or more directing surfaces 950 may be in direct contact with and disposed radially outboard from at least a portion of the one or more lubricant flow surfaces 956. It is within the scope of this disclosure and as a non-limiting example that at least a portion of the one or more directing surfaces 950 may be received and/or retained within at least a portion of a collector receiving portion (not shown) extending along at least a portion of the one or more lubricant flow surfaces 956. The collector receiving portion (not shown) may be used in order to ensure that there is a smooth transition for the lubricating fluid (not shown) as the lubricating fluid (not shown) transitions from the lubricant collector 900 to the one or more lubricant flow surfaces 956 and into the one or more openings 952.

Once an amount of lubricating fluid (not shown) has been received within the one or more openings 952 in the housing 604 of the drive unit assembly 600, the lubricating fluid will travel through one or more second channels or conduits 960. At least a portion of the outlet of the one or more second channels or conduits 960 may be disposed proximate to or directly adjacent to at least a portion of the one or more first shroud channels 660 in the shroud 602. As a result, it is therefore to be understood that at least a portion of the lubricating fluid (not shown) collected by the lubricant collector 900 may be transferred from the ring gear 902 to the shroud 602 in order to lubricate at least a portion of the helical gear 620 of the drive unit assembly 600. In light of the foregoing, it is therefore to be understood that the lubricant collector 900 may be used in place of the collector 800 or in combination with the collector 800.

By providing a lubricant collector 900 with this configuration, it aids in ensuring that the lubricant collector 900 is disposed as close to the ring gear 902 as possible thereby ensuring that the lubricant collector 900 collects as much lubricating fluid (not shown) as possible from the ring gear 902. This aids in ensuring that the lubricating fluid (not shown) disposed within the drive unit assembly 600 transported throughout the drive unit assembly 600 as effectively and efficiently as possible. As a result, the drive unit assembly 600 is able to operate with a lesser volume of lubricating fluid while still ensuring that the various components of the drive unit assembly 600 are properly lubricated at all times when in operation. This aids in increasing the overall efficiency of the drive unit assembly by minimizing churning losses and aids in reducing the overall weight and costs associated with the drive unit assembly.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A drive unit assembly, comprising:
   a differential assembly having a ring gear;
   a lubricant collector disposed proximate to at least a portion of said ring gear;
      wherein said lubricant collector receives an amount of lubricating fluid therein expelled from said ring gear of said drive unit assembly;
      wherein said lubricant collector has one or more first receiving portions and/or one or more second receiving portions defining a collector reservoir therein;
      wherein at least a portion of said one or more first receiving portions are disposed directly adjacent to and radially outboard from at least a portion of a radially outermost surface of said ring gear;
      wherein at least a portion of said one or more second receiving portions are disposed proximate to and axially outboard from at least a portion of a plurality of ring gear teeth on said ring gear;
      wherein said one or more first receiving portions have a first bottom portion extending in a downward angle;
      wherein at least a portion of said first bottom portion of said one or more first receiving portions have a shape defined by a radius;
      wherein said radius of said first bottom portion of said one or more first receiving portions is greater than a radius of said radially outermost surface of said ring gear;
      wherein said one or more second receiving portions have a second bottom portion extending in a downward angle;
      wherein at least a portion of said second bottom portion of said one or more second receiving portions is disposed outboard and off-set from at least a portion of said first bottom portion of said one or more first receiving portions of said lubricant collector;
      wherein at least a portion of said first bottom portion of said one or more first receiving portions and/or at least a portion of said second bottom portion of said one or more second receiving portions terminate at one or more directing surfaces; and
      wherein said one or more directing surfaces of said lubricant collector have one or more surface features thereon.

2. The drive unit assembly of claim 1, wherein said lubricant collector is integrally formed as part of a housing of said drive unit assembly or said lubricant collector is integrally connected to at least a portion of said housing of said drive unit assembly.

3. The drive unit assembly of claim 1, wherein said one or more surface features on said one or more directing surfaces are one or more ribs, one or more channels, one or more grooves and/or one or more areas of increased material thickness.

4. The drive unit assembly of claim 1, further comprising a shroud having an inner surface, an outer surface, a first side, a second side, a first end portion, a second end portion and an intermediate portion interposed between said first and second end portions;
   wherein at least a portion of said shroud is disposed within at least a portion of a hollow interior portion of a housing;
   wherein one or more first shroud channels having one or more inlet openings and one or more outlet openings extend inward into a body portion of said shroud from at least a portion of said second side of said shroud;
   wherein at least a portion of said one or more inlet openings of said one or more first shroud channels are disposed in said second side of said shroud;
   wherein at least a portion of said one or more outlet openings are disposed in said inner surface of said first end portion of said shroud; and
   wherein said lubricant collector directs an amount of said lubricating fluid collected from said ring gear toward said one or more inlet openings in said body portion of said shroud.

5. The drive unit assembly of claim 4, wherein at least a portion of said shroud is integrally connected to at least a portion of said inner surface of said housing or is integrally formed as part of an inner surface of said housing; and/or wherein at least a portion of a helical gear is disposed proximate to at least a portion of said inner surface of said shroud.

6. The drive unit assembly of claim 5, wherein at least a portion of said inner surface of said first end portion and said intermediate portion of said shroud is defined by a substantially continuous radius R1 from a theoretical center TC of said helical gear; and wherein said radius R1 of said shroud is greater than a radius R2 of said outermost surface of said helical gear.

7. The drive unit assembly of claim 4, wherein at least a portion of said second end portion of said shroud has one or more lubricant directing portions; and wherein said one or more lubricant directing portions of said shroud direct an amount of lubricating fluid to a secondary reservoir in said housing.

8. The drive unit assembly of claim 7, wherein said secondary reservoir is integrally formed into said inner surface of said housing or integrally connected to at least a portion of said inner surface of said housing; and/or said secondary reservoir is in fluid communication with one or more channels in said inner surface of said housing in order to supply an amount of lubricating fluid to one or more bearing assemblies rotationally supporting a pinion gear shaft.

9. The drive unit assembly of claim 7, wherein at least a portion of said inner surface of said first end portion and said intermediate portion of said shroud is defined by a substantially continuous radius R1 from a theoretical center TC of a helical gear; and wherein said one or more lubricant directing portions of said shroud extend substantially tangentially relative to said substantially circular path created by said radius R1 of said shroud.

10. The drive unit assembly of claim 4, wherein at least a portion of said inner surface of said first end portion and said intermediate portion of said shroud is defined by a substantially continuous radius R1 from a theoretical center TC of a helical gear; and wherein said one or more lubricant directing portions of said shroud extend at an angle θ1 away from said substantially circular path created by said radius R1 of said shroud.

11. The drive unit assembly of claim 4, wherein said one or more outlet openings are in fluid communication with said one or more first shroud channels by one or more second shroud channels extending at an angle θ2 relative to said one or more first shroud channels in said shroud; and/or wherein said one or more first shroud channels extend inward at an angle θ3 relative to a horizontal plane intersecting said one or more first shroud channels.

12. The drive unit assembly of claim 4, wherein said shroud has one or more protruding portions extending outward from at least a portion of said outer surface of said intermediate portion of said shroud; and wherein said one or more protruding portions of said shroud are received and/or retained within at least a portion of one or more first shroud receiving portions in said inner surface of said housing.

13. The drive unit assembly of claim 12, wherein said inner surface of said housing has one or more second shroud receiving portions that are axially off-set from said one or more first shroud receiving portions; and wherein at least a portion of said second end portion of said shroud is received and/or retained within at least a portion of said one or more second shroud receiving portions.

14. The drive unit assembly of claim 4, further comprising an additional collector having a first side and a second side;

wherein at least a portion of said second side of said additional collector is disposed proximate to at least a portion of said one or more inlet openings of said one or more first shroud channels; and wherein said additional collector collects an amount of lubricating fluid from said lubricant collector and directs said lubricating fluid toward said one or more inlet openings of said one or more first shroud channels in said shroud.

15. The drive unit assembly of claim 14, wherein said outer surface of said additional collector has one or more collector grooves that extend toward said one or more inlet openings of said one or more first shroud channels in said shroud.

16. The drive unit assembly of claim 1, wherein said drive unit assembly is an inter-axle differential assembly.

17. A drive unit assembly, comprising:

a differential assembly having a ring gear;

a lubricant collector disposed proximate to at least a portion of said ring gear; and a shroud having an inner surface, an outer surface, a first side, a second side, a first end portion, a second end portion and an intermediate portion interposed between said first and second end portions;

wherein said lubricant collector receives an amount of lubricating fluid therein expelled from said ring gear of said drive unit assembly;

wherein said lubricant collector has one or more first receiving portions and/or one or more second receiving portions defining a collector reservoir therein;

wherein at least a portion of said one or more first receiving portions are disposed directly adjacent to and radially outboard from at least a portion of a radially outermost surface of said ring gear;

wherein at least a portion of said one or more second receiving portions are disposed proximate to and axially outboard from at least a portion of a plurality of ring gear teeth on said ring gear;

wherein at least a portion of said shroud is disposed within at least a portion of a hollow interior portion of a housing;

wherein one or more first shroud channels having one or more inlet openings and one or more outlet openings extend inward into a body portion of said shroud from at least a portion of said second side of said shroud;

wherein at least a portion of said one or more inlet openings of said one or more first shroud channels are disposed in said second side of said shroud;

wherein at least a portion of said one or more outlet openings are disposed in said inner surface of said first end portion of said shroud; and wherein said lubricant collector directs an amount of said lubricating fluid collected from said ring gear toward said one or more inlet openings in said body portion of said shroud.

* * * * *